United States Patent [19]
Hasegawa et al.

[11] Patent Number: 5,499,128
[45] Date of Patent: Mar. 12, 1996

[54] LIQUID CRYSTAL DISPLAY DEVICE WITH ACRYLIC POLYMER SPACERS AND METHOD OF MANUFACTURING THE SAME

[75] Inventors: Rei Hasegawa; Miki Mori, both of Yokohama, Japan

[73] Assignee: Kabushiki Kaisha Toshiba, Kawasaki, Japan

[21] Appl. No.: 213,074

[22] Filed: Mar. 15, 1994

[30] Foreign Application Priority Data

Mar. 15, 1993 [JP] Japan ................................. 5-053473

[51] Int. Cl.$^6$ .................................................. G02F 1/1339
[52] U.S. Cl. .................................................. 359/81
[58] Field of Search .................................................. 359/81

[56] References Cited

U.S. PATENT DOCUMENTS

| | | | |
|---|---|---|---|
| 4,720,173 | 1/1988 | Okada et al. | 350/341 |
| 4,844,597 | 7/1989 | Katagiri et al. | 350/350 S |
| 4,924,243 | 5/1990 | Sato et al. | 350/320 |
| 4,983,023 | 1/1991 | Nakagawa et al. | 350/344 |
| 5,361,152 | 11/1994 | Harada et al. | 359/80 |

FOREIGN PATENT DOCUMENTS

| | | |
|---|---|---|
| 56-22410 | 3/1981 | Japan ................................. 359/81 |
| 60-249119 | 12/1985 | Japan ................................. 359/81 |
| 61-267736 | 11/1986 | Japan . |
| 64-517 | 1/1989 | Japan . |

*Primary Examiner*—William L. Sikes
*Assistant Examiner*—Charles Miller
*Attorney, Agent, or Firm*—Oblon, Spivak, McClelland, Maier & Neustadt

[57] ABSTRACT

The columnar spacer included in a liquid crystal display device is formed of a photosensitive resin selected from the group consisting of acrylic polymers and acrylic copolymers, said photosensitive resin having at least one atomic group selected from the group consisting of an epoxy group, an imide bond, an ether bond, an ester bond and an urethane bond. The particular photosensitive resin used for forming the columnar spacers permits the surface of a polyimide alignment film to be prevented from being swollen by or dissolved in a developing solution in the subsequent step so as to maintain the crystal orientation satisfactorily.

20 Claims, 11 Drawing Sheets

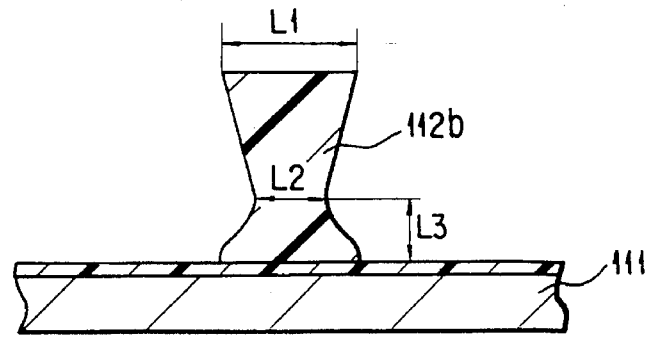
F I G. 8
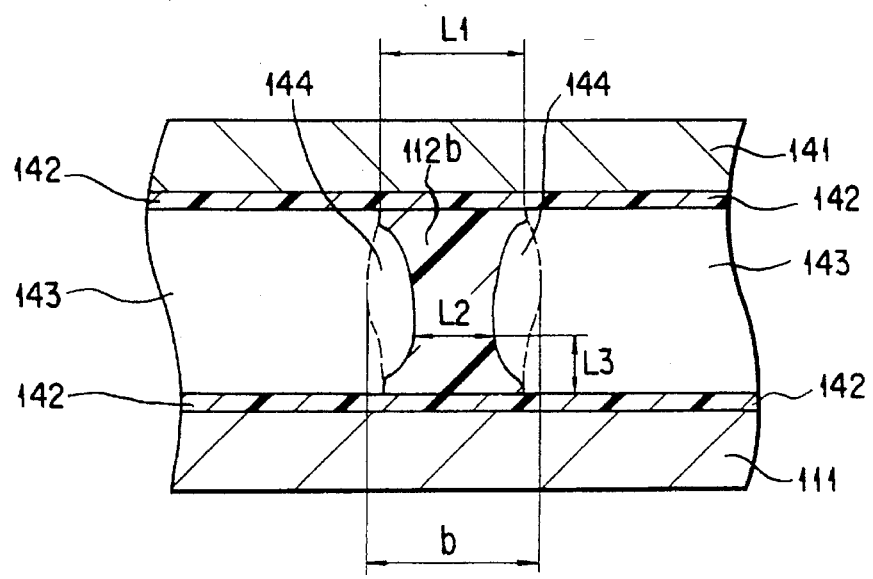
F I G. 9
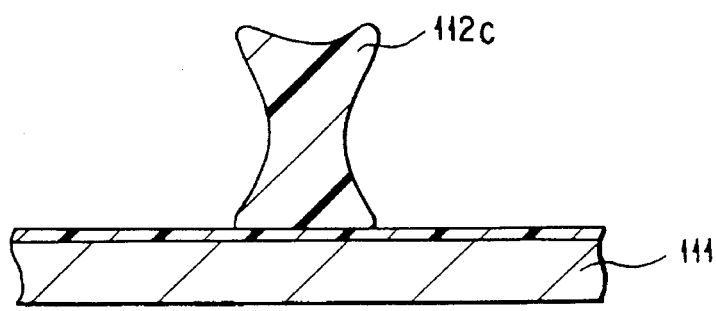
F I G. 10

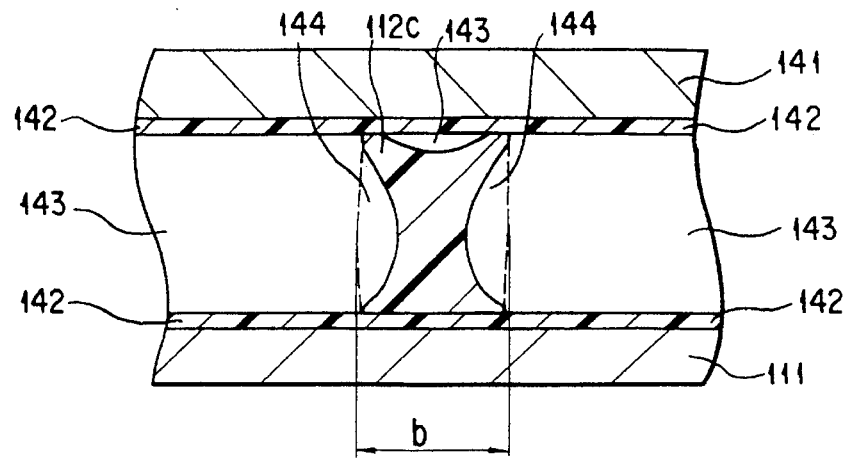
F I G. 11
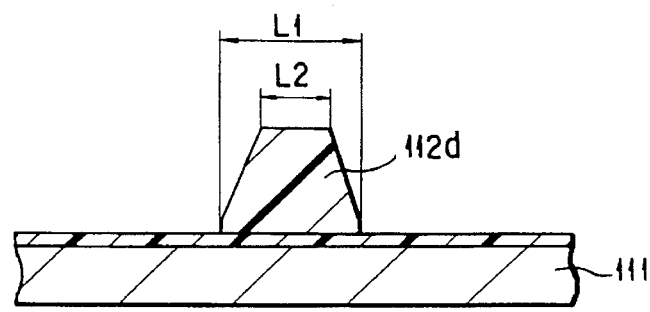
F I G. 12
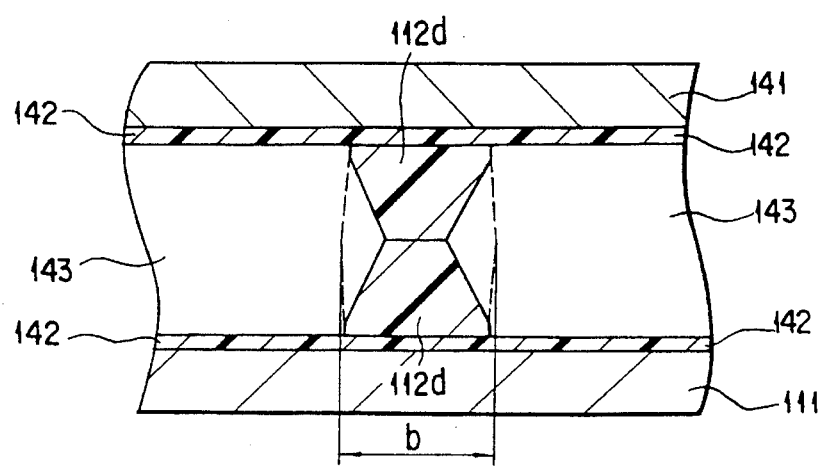
F I G. 13

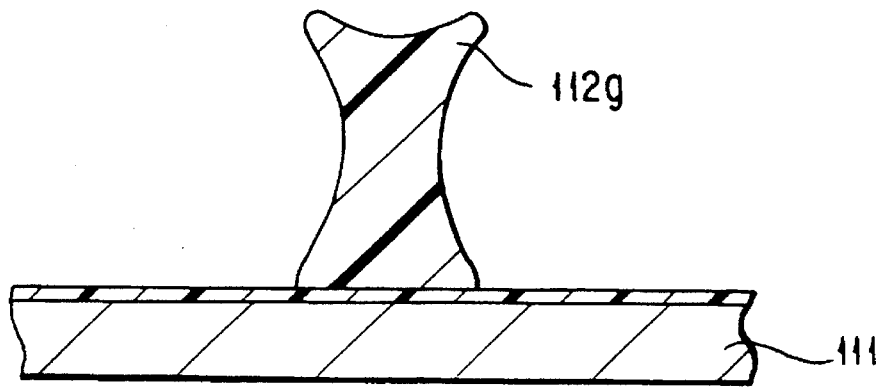
F I G. 20
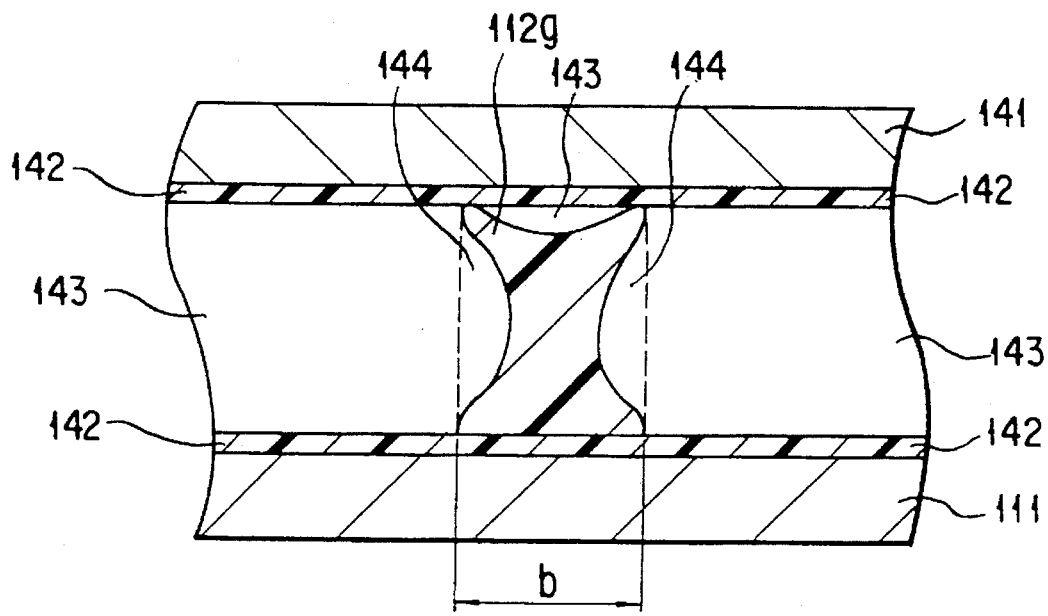
F I G. 21

LIQUID CRYSTAL DISPLAY DEVICE WITH ACRYLIC POLYMER SPACERS AND METHOD OF MANUFACTURING THE SAME

BACKGROUND OF THE INVENTION

1. Field of the Invention

The present invention relates to a liquid crystal display device and a method of manufacturing the same, particularly, to an improvement in the spacer used in the liquid crystal display device.

2. Description of the Related Art

In a liquid crystal display device, the display characteristics of the device are seriously affected by the distance between a pair of mutually opposing substrates included in the device. Specifically, if the distance between the substrates is not uniform over the entire region of the display panel, the display quality of the device is deteriorated. For example, the color and the display on the display panel are rendered uneven. Also, interference stripes appear on the display panel. In recent years, the liquid crystal display panel is required to be highly accurate and tends to become larger and larger in size, with the result that it is more important nowadays to increase the uniformity in the distance between the substrates in order to obtain a liquid crystal display panel of a higher accuracy and a larger display area than in the past.

A liquid crystal display device, which is intended to meet the requirements noted above, is disclosed in, for example, Japanese Patent Disclosure (Kokai) No. 1-134336. The device disclosed in this prior art comprises a first substrate, columnar spacers, and a second substrate. Pixel electrodes, a wiring, etc. are arranged in a matrix form on the surface of the first substrate. An alignment film made of a polyimide is formed on the first electrode to cover these electrodes, etc. followed by forming the columnar spacers made of a light-sensitive polyimide on the alignment film. These columnar spacers are formed by, for example, photolithography. Further, the second substrate is disposed to face the first substrate with the columnar spacers interposed therebetween. Since photolithography is employed, the columnar spacers can be formed in a desired shape at desired positions. Such being the situation, vigorous studies are being made nowadays on the columnar spacer in accordance with increase in the size of the display panel.

In general, the surface of the alignment film made of a polyimide is rubbed with cloth such as velvet to cause an initial orientation of the liquid crystal in a predetermined direction. Where columnar spacers are formed on the alignment film as in the prior art exemplified above, the rubbing treatment of the alignment film formed on the substrate is followed by a process of forming the columnar spacers. To be more specific, the oriented polyimide film is coated with a light-sensitive polyimide, followed by exposure to light and development (etching) so as to form the columnar spacers of a desired shape at desired positions. However, the etching solution causes the surface region of the polyimide alignment film positioned below the light-sensitive polyimide film to be swollen and dissolved in the etching solution. It follows that the formation of the columnar spacers markedly lowers the effect of the rubbing treatment to orient the polyimide alignment film. As a result, when a liquid crystal is loaded in the free space formed between the two substrates included in the liquid crystal display device comprising columnar spacers, the liquid crystal molecules are oriented uneven, leading to deterioration in the quality and contrast of the picture image displayed on the display panel. Further, the on-off control of light cannot be achieved.

To overcome the difficulties described above, it is proposed to apply the rubbing treatment after formation of the columnar spacers. In this method, however, fur of the rubbing cloth is caught by the columnar spacer, with the result that the polyimide film is not sufficiently oriented in the region near the spacer. It follows that a region of defective orientation is brought about around the columnar spacer, giving rise to a marked deterioration in the displayed picture image quality. Proposed in Japanese Patent Disclosure No. 3-127028 is an idea of using a columnar spacer which tapers upwardly such that a vertical cross section of the spacer forms a trapezoid. It is proposed that the angle formed between the alignment film surface and the side surface of the tapering spacer, which is naturally greater than 90°, should be about 135° so as to allow the fur of the rubbing cloth to be unlikely to be caught by the spacer. Even in the case of using the tapering columnar spacer, however, it is impossible to prevent completely the fur from being caught by the spacer in the rubbing step, resulting in failure to improve sufficiently the displayed picture image quality.

It should also be noted that, in general, the liquid crystal around the spacer is affected by the spacer surface, giving rise to a region of disturbed crystal orientation. FIG. 1 schematically shows how the crystal orientation is disturbed around the spacer included in a liquid crystal cell. As shown in FIG. 1, a region 144 of a disturbed orientation is formed around a spacer 112. The disturbance of orientation is gradually increased inward from alignment films 142, which serve to control the liquid crystal orientation, of the upper and lower substrates, reaching the greatest disturbance in the central region of the cell. Naturally, the disturbed region is much widened in the cell central region. Since the liquid crystal molecules in the disturbed region 144 are incapable of achieving an optical rotation, the light cannot be turned ON or OFF in accordance with ON or OFF of the voltage application. In other words, when voltage is not applied across the cell, the incident light is not rotated in the region of the spacer 112 and the region 144 around the spacer in which the crystal orientation is disturbed. Thus, if a white level is displayed in the normally white mode, black dots are observed in the region of the spacer 112 and the region 144 around the spacer, leading to deterioration in the display quality. Likewise, if a black level is displayed in the normally black mode, white dots (light leakage) are observed in the region of the spacer 112 and the region 144 around the spacer, which also leads to deterioration in the display quality.

In the conventional liquid crystal display device, the disturbance of the crystal orientation is much widened around the columnar spacer, particularly in the central region of the cell, with the result that the area of the black dot or white dot (light leakage) appearing on the display screen is rendered much larger than the area of the spacer 112 so as to be sufficiently recognized by the naked eye.

SUMMARY OF THE INVENTION

An object of the present invention is to provide a liquid crystal display device, which permits overcoming the problems inherent in the conventional liquid crystal display device having columnar spacers, and which also permits preventing the surface of the polyimide alignment film from being swollen by and dissolved in a developing solution so as to retain the effect of the rubbing treatment even after the developing step in the process of forming columnar spacers, thereby improving the quality of the displayed image on the screen.

Another object is to provide a liquid crystal display device which permits sufficiently diminishing the area of the black or white dot derived from the disturbed region of crystal orientation around the spacer so as to improve the quality of the displayed image on the screen.

According to a first embodiment of the present invention, there is provided a liquid crystal display device, comprising:

first and second substrates facing each other;

means for spacing the first and second substrates, the spacing means being columnar and made of substantially one photosensitive resin selected from the group consisting of acrylic polymers and acrylic copolymers, and the photosensitive resin having at least one atomic group selected from the group consisting of an epoxy group, an imide bond, an ether bond, an ester bond and an urethane bond;

a light transmission control layer positioned in a space between the first and second substrates held apart from each other by the spacing means; and control means for controlling the light transmission control layer so as to turn light on or off.

The photosensitive resin used in the present invention has such a high sensitivity that the resin is sensitive to even an ultraviolet light of 10 mW/cm$^2$, a high aspect ratio and an excellent adhesivity to a polyimide alignment film. Also, the resin has a high stability to the liquid crystal material, and such a high mechanical strength that the spacing means made of the resin can perform its function in the liquid crystal display device substantially permanently. Further, the resin permits forming lines and spaces each having a width of 5 μm and a sharp edge so as to enable the liquid crystal display device to achieve a sufficiently high resolution.

According to a second embodiment of the present invention, there is provided a method of manufacturing a liquid crystal display device of the first embodiment, comprising the steps of:

forming a film consisting essentially of polyimide on a first substrate having a transparent electrode in a pixel region;

applying an alignment treatment to the polyimide film;

coating the oriented polyimide film with substantially one photosensitive resin selected from the group consisting of acrylic polymers and acrylic copolymers to form a photosensitive resin film, the photosensitive resin having at least one atomic group selected from the group consisting of an epoxy group, an imide bond, an ether bond, an ester bond and an urethane bond;

exposing the photosensitive resin film to light;

developing with a developing agent having a solubility parameter not more than 9.8 cal$^{1/2}$.cm$^{-3/2}$ or not less than 12.7 cal$^{1/2}$.cm$^{-3/2}$, to form spacing means made of the photosensitive resin; and forming a liquid crystal display element by using the first substrate having the spacing means formed thereon, a second substrate having a transparent electrode and an alignment film formed thereon, the alignment film consisting essentially of polyimide, and a liquid crystal material.

The present invention also provides a method of manufacturing a liquid crystal display device, which comprises the step of loading a liquid crystal material in a space defined by a first substrate, a second substrate and spacing means so as to form a liquid crystal layer. This method may comprise the step of mounting control means to a liquid crystal display element so as to control the liquid crystal layer to turn light on or off.

In the present invention, it is also possible to utilize the photosensitive resin as a masking layer which is used in the step of forming a means for connecting the control means to the first substrate. The masking layer and the spacing means can be formed simultaneously in the same step.

According to the present invention, there is provided a method of manufacturing a liquid crystal display device, which comprises the masking layer noted above, comprising the steps of:

forming a film consisting essentially of polyimide on a first substrate having a transparent electrode formed in a pixel region;

applying an alignment treatment to the film;

forming a photosensitive resin film by coating the alignment film and the non-pixel region on the substrate with substantially one photosensitive resin selected from the group consisting of acrylic polymers and acrylic copolymers, the photosensitive resin having at least one atomic group selected from the group consisting of an epoxy group, an imide bond, an ether bond, an ester bond and an urethane bond;

exposing the photosensitive resin film to light;

developing with a developing agent having a solubility parameter not more than 9.8 cal$^{1/2}$.cm$^{-3/2}$ or not less than 12.7 cal$^{1/2}$.cm$^{-3/2}$, to form spacing means made of the photosensitive resin within the pixel region on the substrate and a masking layer made of the photosensitive resin within the non-pixel region on the substrate;

forming a liquid crystal display element by using the first substrate having the spacing means formed thereon, a second substrate having a transparent electrode and an alignment film formed thereon, the alignment film consisting essentially of polyimide, and a liquid crystal material; and applying a plating treatment to the non-pixel region to form connecting means in that region on the first substrate which is not covered with the masking layer.

Unlike the conventional developing solution for a photosensitive polyimide resin used for forming a spacing means, the developing solution used in the present invention for the development of the resin does not contain a component which causes deterioration of the polyimide alignment film. It follows that, in the case of using the photosensitive resin specified in the present invention, a spacer can be formed after the rubbing treatment applied to the polyimide film. To be more specific, the effect of the rubbing treatment is not impaired even if the spacer is formed after the rubbing treatment.

Further, it is possible in the present invention to modify the shape of the spacing means included in the device. Specifically, the central portion of the columnar spacing means can be made thinner than the edge portions. In the case of using the columnar spacer of the modified shape, the disturbed region of the crystal orientation around the columnar spacer, particularly, the cell central region where the liquid crystal orientation is most disturbed, can be positioned within the recessed region in the central portion of the spacer. It follows that it is possible to diminish sufficiently the area of the black dot in the normally white mode or the white dot in the normally black mode, said black or white dot being caused by the disturbance of the liquid crystal orientation, so as to improve the display quality of the element.

It is also possible to form a recess in the central portion of at least one end surface in contact with the substrate of the columnar spacer. In this case, the liquid crystal positioned within the recessed region serves to scatter the light, with the result that the white dot in the normally black mode can be markedly suppressed in the spacer portion so as to improve the display quality of the liquid crystal display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8 and 9 are cross sectional views collectively showing a second modification of the liquid crystal display device having an improved spacing means;

FIGS. 10 and 11 are cross sectional views collectively showing a third modification of the liquid crystal display device having an improved spacing means;

FIGS. 12 and 13 are cross sectional views collectively showing a fourth modification of the liquid crystal display device having an improved spacing means;

FIGS. 20 and 21 are cross sectional views collectively showing a seventh modification of the liquid crystal display device having an improved spacing means.

DETAILED DESCRIPTION OF THE PREFERRED EMBODIMENTS

Figure 1:
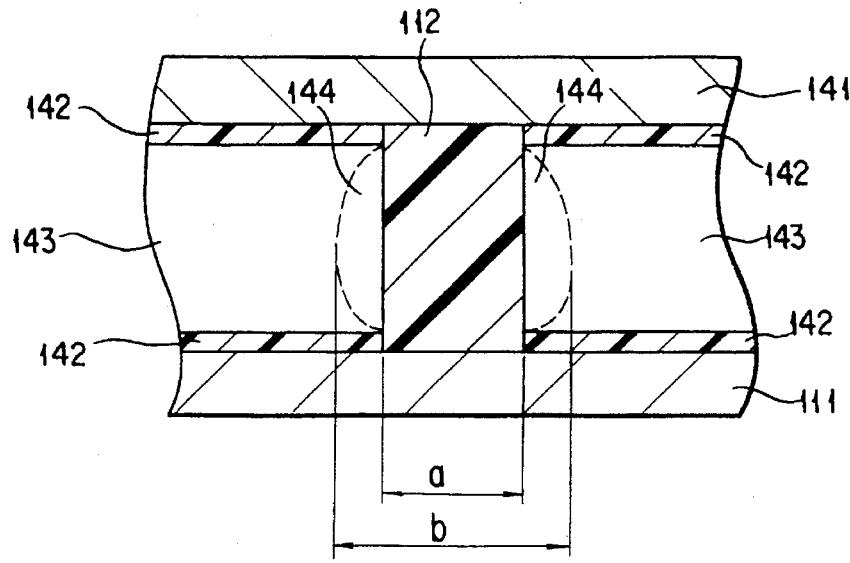
FIG. 1 schematically shows how the crystal orientation is disturbed around the spacer in a liquid crystal display element.

The present inventors have made an extensive research on a developing solution on the assumption that the deterioration of the polyimide alignment film is caused by the developing solution. It has been found that the developing solution which deteriorates the surface of a polyimide alignment film after the rubbing treatment contains at least one organic solvent such as an organic alkaline solution of tetramethyl ammonium hydroxide, phenol, γ-butyrolactone, N-methyl pyrrolidone and acetone. The particular organic solvent has been found to cause deterioration of the polyimide alignment film.

Based on the finding, the present inventors have made an extensive research on photosensitive resins which permit using a developing solution not containing such an organic solvent for easily forming a spacing means having a desired mechanical strength. It has been found that the requirements can be met by an acrylic polymer or an acrylic copolymer, which has at least one member selected from an epoxy group, an imide bond, an ether bond, an ester bond and an urethane bond.

In the case of using the acrylic polymer or copolymer noted above, it is possible to use a developing solution prepared by using a solvent such as an organic chlorine-based solvent, e.g., 1,1,1-trichloroethane or methylene chloride, a cellosolve type solvent, e.g., methyl ethyl cellosolve, or an ether, e.g., dipropyleneglycol monomethyl ether ($H_3COC_3H_6OC_3H_6OH$), dipropyleneglycol monomethyl ether ($H_5C_2OC_3H_6OC_3H_6OH$), tripropyleneglycol monomethyl ether ($H_3CO(C_3H_6O)_3H$), or tripropyleneglycol monoethyl ether ($H_3C_2O(C_3H_6O)_3H$). It has been found that the solvent exemplified above does not deteriorate the polyimide alignment film surface even if the solvent is applied to the film surface after the rubbing treatment.

Further, the photosensitive resin used in the present invention is stable against a liquid crystal and, thus, is capable of playing substantially permanently the role of a spacing means within the liquid crystal display device. What should also be noted is that the particular resin permits forming lines and spaces each having such a small width as 5 μm and also having a sharp edge, leading to a high resolution. Still further, the particular resin exhibits such a high sensitivity as to be sensitive to an ultraviolet light of 10 mW/cm$^2$, a high aspect ratio, and a good adhesivity to the polyimide alignment film.

Let us describe more in detail the photosensitive resins used in the present invention.

An acrylic polymer can be formed by mixing an acrylic monomer, $CH_2$=CH—CO—O—R, or a methacrylic monomer, $CH_2$=C($CH_3$)—CO—O—R, with a photopolymerization initiator, and then emitting a light to perform polymerization reaction. Polymethacrylate is defined here as containing polymethacrylate.

According to the present invention, it is preferable to use an acrylic polymer having a substituent such as an epoxy group, an imide group, a methoxy group or an urethane group as the group R. In such acrylic polymer causes not only polymerization at C— and C= in the acrylic group (main chain), but polymerization to be crosslinked in a side chain R or to be hardened due to the function in a side chain R as a hard segment, thereby spacing means having desired hardness more than 3H, preferably 4H by pencil hardness, that is more than 85, preferably 95 by M scale of Rockwell hardness, and having more than 150° C., preferably 170° of thermal deformable temperature can be obtained.

Examples of the acrylic polymer having an epoxy group on a side chain are obtained by reaction photoinitiators with such as 9-oxyranylnonylacrylate, oxyranylmethy acrylate, 6,7-epoxy decahydro-1,4:5,8-dimenthanonaphthalene-2-ylacrylate, 2,3-epoxyhexahydro-4,7-methanoindane-5-ylacrylate, 3-oxatricyclo[3.2.1.0$^{2.4}$]octa-6-ylacrylate, 7-oxabicyclo[4.1.0]hepta-3-ylmethylacrylate, (3-methyloxylanyl)methylacrylate, (3-methyloxylanyl)methymethacrylate, glycidylacrylate, glycidylmethacrylate.

Examples of the acrylic polymer having an imide bond on a side chain are obtained by reaction photoinitiators with such as 2-(3-oxazolidinyl)ethylacrylate, [[[2-(2-oxoimidasolidine 1-yl)ethyl]amino]carbonyl]methyl acrylate, 2-(2-oxso-1-pylolidinyl)oxy]carbonyl]phenylacrylate, 1,3,3a,4,7,7a-hexahydro-4,7-methano(-pylolidinyl)ethylacrylate.

Examples of the acrylic polymer having an ether bond on a side chain are obtained by reaction photoinitiator with such as monometoxy 1,6-hexanediol monoacrylate, monometoxy tripropyleneglycol monoacrylate, monomethoxy neopentylglycol alkoxymonoacrylate monomethoxy trimethylolpropane alkoxydiacrylate, 2-[2-(ethoxy)ethoxy]ethylacrylate, 2-[2-(ethoxy)ethoxy]ethylmethacrylate, (1-methyethylidene)bis(4,1-phenyleneoxyl-2,1-ethanediyl-)diacrylate, 2-[2-(2-vinyloxyethoxy)-ethoxy]ethylmethacrylate.

Examples of the acrylic polymer having an ester bond on a side chain are obtained by reaction photoinitiator with such as 1-(ethoxycarbonyl)ethylacrylate, 1-(ethoxycarbonyl)ethylmethacrylate, 2-hydroxy-3-[(2-methyl-1-oxso-2-propenyl)oxy]-propylacrylate, ethyleneglycol diacrylate, butyleneglycol dimethacrylate.

Examples of the acrylic polymer having an urethane bond are obtained by reaction photoinitiators with such as polyether(polyethyleneglycol)-trilenedissosyanate.

A further example of the acrylic polymer having an ether bond is also a cardoepoxyacrylate resin. The resin is obtained by reacting a compound represented by the following chemical formula 1,

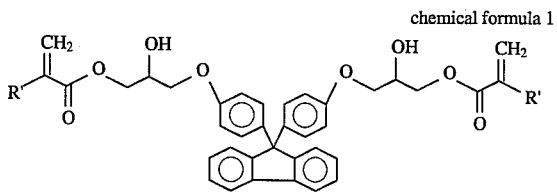

chemical formula 1 wherein R' is H or $CH_3$, with a photoinitiator.

The resin is used for producing a color filter and especially has an excellent chemical-resistant.

Examples of a photoinitiator for forming an acrylic polymer are 2-methyl-1-[4-(methylneo)phenyl]-2-morpholinopropane-1-on, 1-hydroxycyclohexylphenylketone, benzophenon, 2,4-diethylthioxanthone singly or inner combinations of at least two member thereof.

The monomers for the acrylic polymer preferably used in the present invention include, such as monomethoxy 1,6-hexanediol monoacrylate, monomethoxy tripropyleneglycol monoacrylate, monomethoxy neobenzylglycol alkoxy monoacrylate, monomethoxy trimethylolpropane alkoxy diacrylate, and cardepoxyacrylate.

The acrylic copolymers preferably used in the present invention include, for example, copolymers of an acrylate $(CH_2=CR_1COOR_2)$ and at least one comonomer selected from the group consisting of an epoxy compound, a polyamic acid, a methoxy ether compound, an ester compound and an urethane compound. It is desirable for $R_1$ included in the acrylate noted above to be H or an alkyl group such as $CH_3$. To be more specific, the acrylic copolymers used in the present invention include, for example, urethane acrylic copolymers, ester acrylic copolymers, polyimide acrylic copolymers, epoxy acrylic copolymers and ether acrylic copolymers.

Examples of the acrylcopolymer can be obtained for using initiators with such as 2-(1-aziridinyl)ethylacrylate, (aminocarbonyl)methylacrylate, ethenylacrylate(vinylacrlate), vinylmethacrylate, N-methylolacrylamido.

As described above, acrylic polymers or copolymers having on the side chain of the molecule at least one substituent selected from the group consisting of an epoxy group, an imide bond, an ether bond, an ester bond or an urethane bond are used in the present invention as the photosensitive resin for forming a columnar spacer. The use of the particular resin makes it possible to use a developing solution which does not disturb the initial orientation of the polyimide alignment film to which an alignment treatment is applied in advance, leading to an improved quality of the picture image displayed on the screen of a liquid crystal display device.

The photosensitive resin described above is used in the liquid crystal display device according to the first embodiment of the present invention. Specifically, the present invention according to the first embodiment provides a liquid crystal display device, comprising:

first and second substrates facing each other;

means for spacing said first and second substrates, said spacing means being columnar and made of substantially at least one photosensitive resin selected from the group consisting of acrylic polymers and acrylic copolymers, and said photosensitive resin having at least one atomic group selected from the group consisting of an epoxy group, an imide bond, an ether bond, an ester bond and an urethane bond;

a light transmission control layer positioned in a space between the first and second substrates held apart from each other by the spacing means; and control means for controlling said light transmission control layer so as to turn light on or off.

The liquid crystal display device described above can be manufactured by the method according to the second embodiment of the present invention. To be more specific, the present invention according to the second embodiment provides a method of manufacturing a liquid crystal display device of the first embodiment, comprising the steps of:

forming a film consisting essentially of polyimide on a first substrate having a transparent electrode in a pixel region;

applying an alignment treatment to said polyimide film;

coating the oriented polyimide film with substantially one photosensitive resin selected from the group consisting of acrylic polymers and acrylic copolymers to form a photosensitive resin film, said photosensitive resin having at least one atomic group selected from the group consisting of an epoxy group, an imide bond, an ether bond, an ester bond and an urethane bond; and exposing said photosensitive resin film to light;

developing with a developing agent having a solubility parameter not more than 9.8 $cal^{1/2}.cm^{-3/2}$ or not less than 12.7 $cal^{1/2}.cm^{-3/2}$, to form spacing means made of the photosensitive resin.

The method described above permits forming a substrate having a spacer consisting of the particular photosensitive resin of the present invention formed thereon. Further, a liquid crystal layer is formed on the substrate having a spacer formed thereon by the method described below so as to manufacture a liquid crystal display device.

The developing agent has specific solubility parameter. When the developing agent has a solubility varameter more than 9.8 $cal^{1/2}.cm^{-3/2}$ and less than 12.7 $cal^{2/1}.cm^{-3/2}$, the solubility parameter is similar to a solubility parameter of polyimide, the polyimide alignment film causes dissolution or swelling to be deteriorated. The developing agent according to the present invention prevent a polyimide from dissolution and swelling.

Examples of the developing agent are ethers such as dipropyleneglycol monomethylether ($H_3COC_3H_6OC_3H_6OH$), dipropyleneglycol monoethylether ($H_5C_2OC_3H_6OC_3H_6OH$), tripropyleneglycol monomethylether ($H_3CO(C_3H_6O)_3H$), tripropyleneglycol monoethylether ($H_5C_2O(C_3H_6O)_3H$), ethyleneglycol monoethylether, diethyleneglycol dimethylether, and propyleneglycol monobutylether, polyvalent alcohols such as ethylene glycol monoethyletheracetate, and ethyleneglycol methyletheracetate, alcohols such as ethanol, n-propanol, iso-propanol, butanol, esters such as ethyl acetate, n-butyl acetate isobutyl acetate ethyl lactate, hydrocarbons such as n-pentane, n-hexane, n-heptane, cyclohexane, and xylene, Cellosolves such as ethyl Cellosolve acetate, butyl Cellosolve acetate and isopropyl cellosolve acetate, and the other solvents such as methyl ethyl ketone diacetonealcohol, water, 1,1,1-trichloroethane, methylene chloride.

Specifically, the method noted above comprises the step of preparing a second substrate having a transparent electrode and an alignment film formed thereon, said alignment film consisting essentially of a polyimide, the step of arranging the second substrate to face the first substrate with the spacer interposed therebetween, the step of loading a liquid crystal material in the space defined by the first and second substrates and the spacer so as to form a liquid crystal layer and, thus, to obtain a liquid crystal display element, and the step of mounting a control means to the liquid crystal display element, said control means serving to control the liquid crystal layer so as to turn light on or off.

In the method described above, it is also possible to apply first a liquid crystal material to the first substrate, followed by arranging the second substrate, so as to obtain the liquid crystal display element.

In the liquid crystal display device of the present invention, it is possible to improve the shape of the spacing means so as to suppress the disturbance of the liquid crystal orientation around the spacing means. For example, it is desirable to make the central portion of the columnar spacing means thinner than at the end portions so as to provide a recessed region in the central portion of the spacing means. It is also desirable to form a recessed region in the central portion of at least one end surface in contact with the substrate of the columnar spacing means. More desirably, the columnar spacing means should be shaped to incorporate the two improvements noted above. These improvements permit the disturbed region of the crystal orientation caused by the presence of the spacing means to be positioned within the recessed region in the central portion of the columnar spacing means so as to markedly diminish the area of the black dot or white dot (light leakage) on the screen of the liquid crystal display element. Further, the liquid crystal positioned in the recessed region in the central portion of the end surface in contact with the substrate of the spacer serves to scatter the light so as to prevent the white dot (light leakage) caused by the presence of the spacing means.

Let us describe a first example of the liquid crystal display device of the present invention with reference to the accompanying drawings. Used in this example was glycidyl acrylate, i.e., a polyacrylate having an epoxy group on the side chain, as a photosensitive resin forming a columnar spacer.

Specifically, FIGS. 2A to 2G are cross sectional views collectively showing how to manufacture a liquid crystal display device of the present invention. Throughout the drawings, the same reference numeral denotes the same member of the device unless otherwise specified.

Figure 2A:
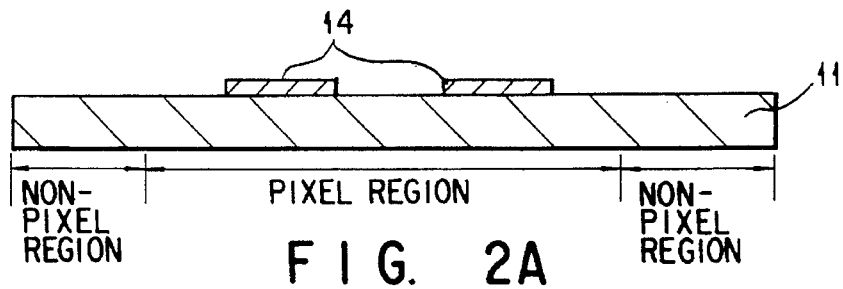
FIGS. 2A to 2G are cross sectional views collectively showing as a first example a method of manufacturing a liquid crystal display device of the present invention.
Figure 2B:
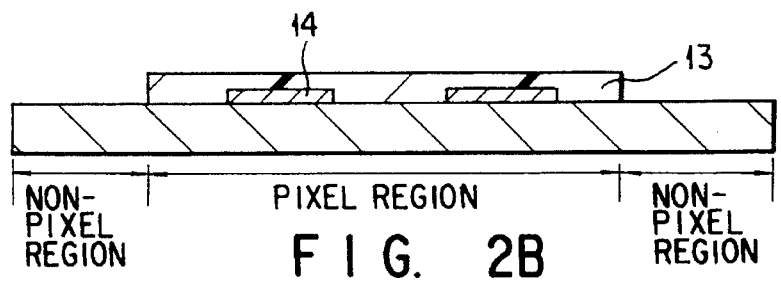

As shown in FIG. 2A, a TFT (thin film transistor) and a pixel electrode 14 were formed in a matrix shape on a first substrate 11. Then, a pixel region of the first substrate 11 was coated with a polyimide film by a spin coating method with a rotating speed of 2500 rpm, as shown in FIG. 2B. The polyimide used was a ring-closing type under heating. Then, the polyimide film was baked at 100° C. for 15 minutes by using a hot plate, followed by further baking the film at 180° C. for 1 hour within an $N_2$ oven and subsequently applying a rubbing treatment to the baked film so as to form an alignment film 13.

Figure 2C:
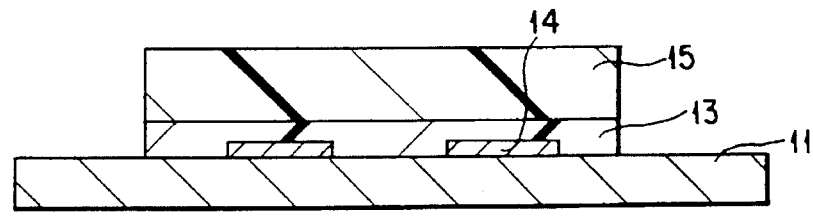
Figure 2D:
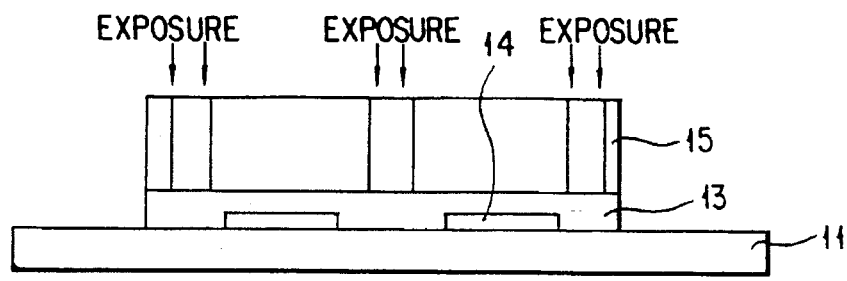
Figure 2E:
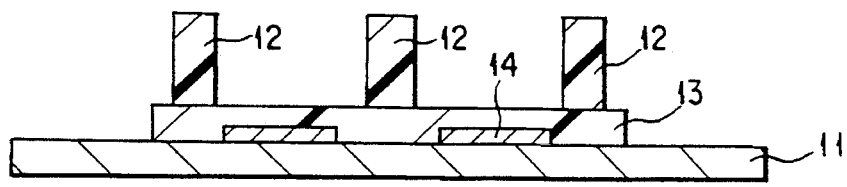

In the next step, a solution mixture of glycidyl acrylate, photointiator (IRGA CURE 907 CHIBA GAIGY Inc.), and ethyl cellosolve acetate, at a ratio of 10:1:40, was applied to the alignment film 13 by spin coating at 2500 rpm, followed by heating at 80° C. for 20 minutes so as to vaporize ethyl Cellosolve acetate to form a film 15, as shown in FIG. 2C. Then, the film 15 was exposed to light through an exposing mask to form a pattern of columnar spacers 12, as shown in FIG. 2D, followed by applying a developing treatment to the patterned columnar spacer, as shown in FIG. 2E. A parallel light having a maximum wavelength of 365 nm and an energy density of 50 mW/cm$^2$ was used for the exposing treatment. On the other hand, the developing treatment was carried out by spraying a developing solution containing as a main component tripropyleneglycol monoethyl ether for 60 seconds. The developing solution was sprayed under a flowing rate of 9 ml/min and under a nitrogen gas pressure of 1.5 kg/cm$^2$.

The developing treatment was followed by a rinsing treatment with a flowing water for 60 seconds. Then, the rinsing treatment was further followed by a spin drying treatment for 20 seconds using a nitrogen gas, so as to form the columnar spacer 12 made of epoxy acrylate resin on the substrate. After formation of the columnar spacer 12, an ultraviolet light having an energy density of 5 W/cm$^2$ was applied to the entire substrate, followed by heating at 180° C. for 30 minutes so as to cure completely the resin. The columnar spacer thus formed was found to be 5.9 μm in height and 15 μm in diameter.

In the next step, a second substrate 21 having a transparent electrode, a color filter and a black matrix formed thereon was coated with an alignment film 23, followed by applying an alignment treatment and subsequently printing a sealing material (not shown), which is curable upon irradiation with an ultraviolet light, to the periphery of the substrate.

Figure 2F:
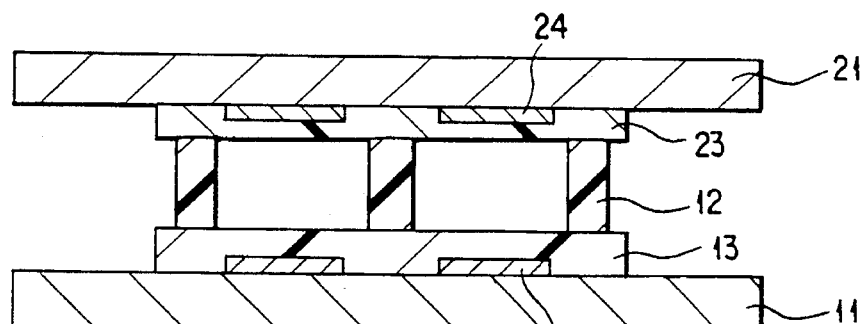

Further, the first substrate 11 and the second substrate 21 were assembled as shown in FIG. 2F. Under this condition, an ultraviolet light was applied to the assembly under pressure so as to cure the sealing material and, thus, to obtain a cell. Then, a liquid crystal was injected into the space defined by the first and second substrates 11, 21 and the spacer 12 so as to obtain a liquid crystal display element having a diagonal length of 9 inches.

The liquid crystal display device thus prepared was found to be highly accurate. Specifically, the gap over the entire region was found to be as small as ±0.2 μm. Further, since tripropyleneglycol monomethyl ether was used for the developing treatment, the surface of the alignment film after the rubbing treatment was free from swelling and dissolving, with the result that the liquid crystal was oriented uniformly so as to obtain an excellent displayed image on the screen.

In using a photosensitive resin as a material of the columnar spacer as in the liquid crystal display device described above, it is desirable to form the columnar spacers at a density of 0.05 to 700/mm$^2$. It is also desirable for the cross section of the columnar spacer parallel with the substrate surface to be circular or elliptical, though it is acceptable for the particular cross section to be polygonal such as rectangular, oblong or triangular.

In the case of using a positive photosensitive resin, the light-exposed portion is decomposed and, then, selectively removed by the subsequent developing treatment. On the other hand, in the case of using a negative photosensitive resin, a crosslinking reaction or a polymerization reaction is induced in the light-exposed portion so as to be solidified, with the result that the light-exposed portion is selectively left unremoved after the subsequent developing treatment. A negative photosensitive resin was used in the example described above. However, a positive photosensitive resin can also be used, if it is possible to find a developing solution which does not cause deterioration of the alignment film after the rubbing treatment.

Let us describe a second example of the liquid crystal display device of the present invention. The second example is a modification of the liquid crystal display device described above. A series of steps employed in the first example for forming on the substrate columnar photosensitive resin layers acting as spacers are also employed in the second example. In addition, columnar photosensitive resin layers are formed not only within the region on the substrate where spacers are to be formed but also within the region where a control means for controlling the liquid crystal to turn light on or off is to be formed by using the material equal to that used for forming the spacer. As a result, the connecting step of the control means to an IC and to the substrate of the liquid crystal display device can be simplified.

The liquid crystal display device of the type described above can be formed by the method described below, said method comprising the step of forming spacers on the substrate. Specifically, the present invention also provides a method of manufacturing a liquid crystal display device, comprising:

the step of forming a film consisting essentially of polyimide on a first substrate having a transparent electrode formed in the pixel region;

the step of applying an alignment treatment to the film formed on the first substrate;

the step of coating the alignment film and a driving circuit region within a non-pixel region of the substrate with a photosensitive resin so as to form a photosensitive resin film, said photosensitive resin consisting essentially of one kind of a photosensitive resin selected from the group consisting of an acrylic polymer and an acrylic copolymer and having at least one atomic group selected from the group consisting of an epoxy group, an imide bond, an ether bond, an ester bond and an urethane bond;

the step of selectively exposing said photosensitive resin film to light;

the step of developing the resin film selectively exposed to light by using a developing agent having a solubility parameter not more than 9.8 cal $^{1/2}$.cm$^{-3/2}$ or not less than 12.7 cal $^{1/2}$.cm$^{-3/2}$, so as to form spacing means consisting of said photosensitive resin within the pixel region on the substrate and to form a masking layer made of said photosensitive resin within the non-pixel region;

preparing a second substrate having a transparent electrode and an alignment film consisting essentially of polyimide formed thereon and disposing said second substrate to face said first substrate with spacers interposed therebetween;

preparing a liquid crystal display element by loading a liquid crystal material in a space defined by the first and second substrates and the spacers so as to form a liquid crystal layer;

applying a plating treatment to the non-pixel region so as to form connecting means in the region which is not covered with the masking layer; and mounting control means serving to control said liquid crystal layer to turn light on or off to the liquid crystal display element via said connecting means.

FIGS. 3A to 3H collectively show how to manufacture the second example of the liquid crystal display device of the present invention.

The liquid crystal cell included in the device of the second example was prepared by a method similar to that of the first example shown in FIGS. 2A to 2G, except that the material of the columnar spacer used in the second example differed from that used in the first example and that the driving circuit was integrally formed in the second example. Further, in the second example, the plated resist for forming the bonding bump and the columnar spacer were made of the same material so as to simplify the manufacturing process.

Figure 3A:
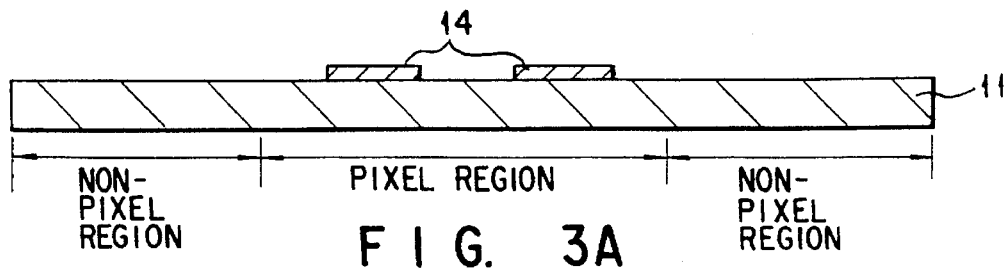
FIGS. 3A to 3H are cross sectional views collectively showing as a second example a method of manufacturing a liquid crystal display device of the present invention.
Figure 3B:
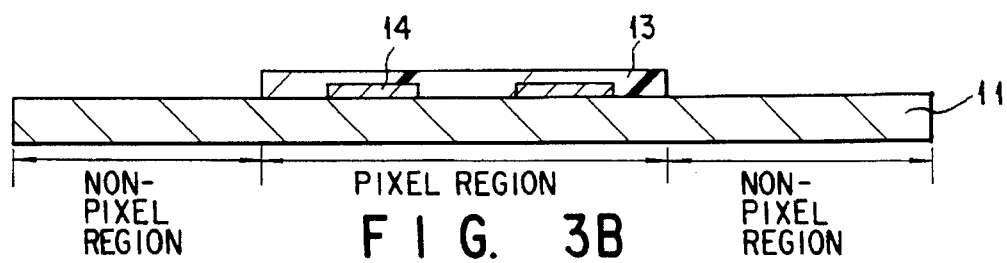

Specifically, a first substrate 11 having a TFT (not shown) and pixel electrodes 14 formed thereon in a matrix arrangement was prepared first as shown in FIG. 3A. The first substrate 11 was spin-coated with polyimide of ring-closing type upon heating, i.e., polyimide which is converted to include a ring structure upon heating, at a spinning speed of 2500 rpm, as shown in FIG. 3B, followed by heating the coated polyimide at 100° C. for 15 minute by using a hot plate. Then, the polyimide film in the region of forming a bump was removed by using γ-butyrolactone, followed by baking the remaining polyimide film at 180° C. for one hour within a $N_2$ oven. Further, a rubbing treatment was applied to the baked film so as to form an alignment film 13.

Figure 3C:
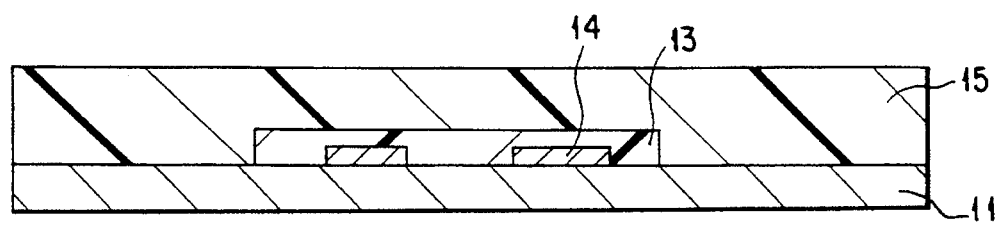
Figure 3D:
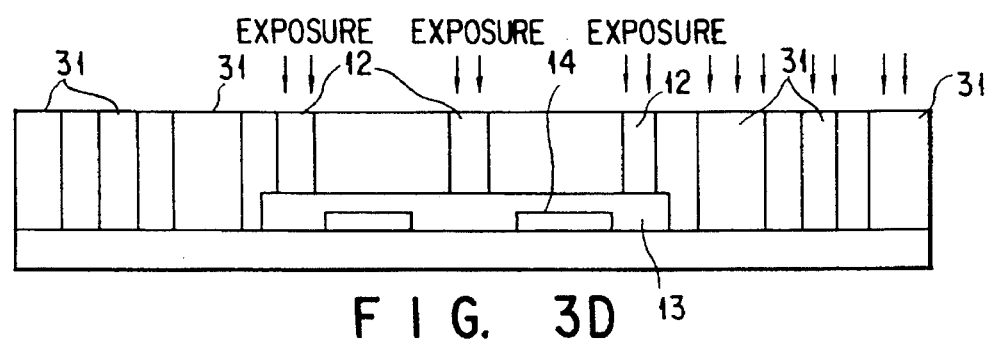

In the next step, the entire region of the substrate 11 including the alignment film 13 and the non-pixel region was spin-coated with a mixed solution containing monometoxy 1,6-hexanediol monoacrylate, IRGA CURE 907, and ethyl cellosolve acetate (30:1:40), both having a negative photosensitivity, at a speed of 2500 rpm, followed by heating at 80° C. for 20 minutes, as shown in FIG. 3C. Then, the resultant film was selectively exposed to light through a mask to form a masking layer pattern which is used in the subsequent step for forming columnar spacers and a connecting bump for assisting the connection of a control means, followed by a developing treatment, as shown in FIG. 3D. In this step, a photopolymerization took place in the light-exposed portion of the film so as to form a polyetheracrylate on the side chain. Used in the light exposure step was a parallel light having a maximum wavelength of 365 nm and an energy density of 50 W/cm².

Figure 3E:
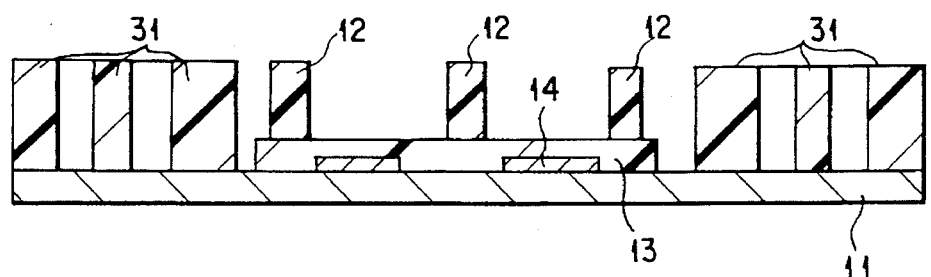

In the developing step, a developing solution containing tripropyleneglycol monomethyl ether as a main component was sprayed at a flow rate of 9 ml/min for 45 seconds under a nitrogen gas pressure of 1.5 kg/cm², followed by rinsing for 60 seconds with a flowing water and, then, spin-drying for 60 seconds using a nitrogen gas. As a result, columnar spacers 12 and masking layers 31 each consisting of acrylic acid ester resin were formed on the substrate, as shown in FIG. 3E. Further, the entire surface of the substrate was irradiated with an ultraviolet light having an energy density of 5 W/cm², followed by an additional heating at 180° C. for 30 minutes so as to cure completely the resin. As a result, the columnar spacer 12 was found to be 5.0 μm in height and 15 μm in diameter.

Figure 3F:
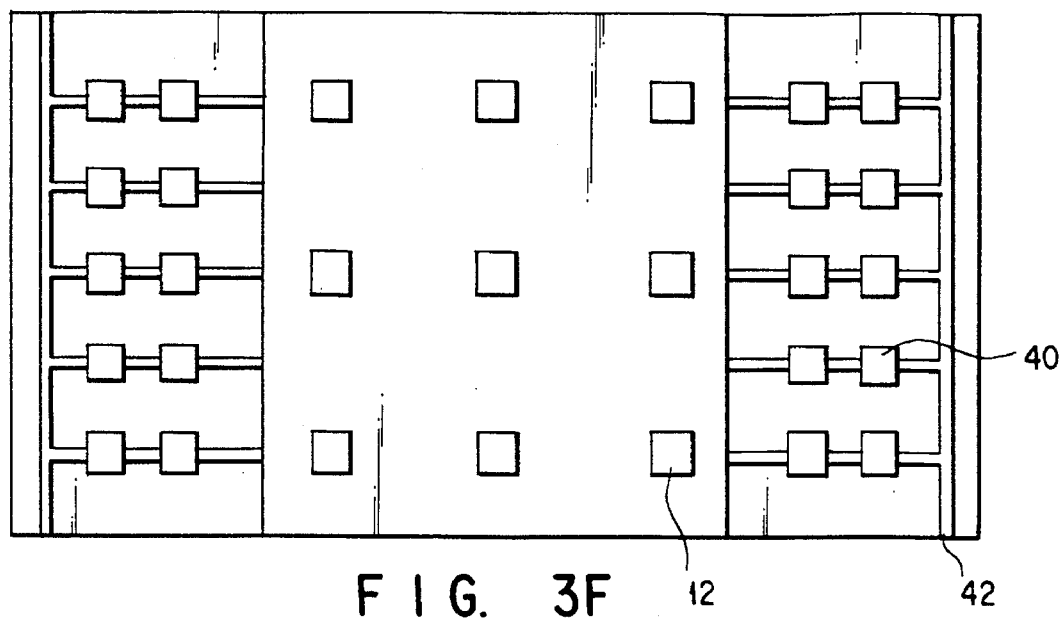

FIG. 3F is a plan view of FIG. 3E. In other words, FIG. 3F shows how the arrangement of FIG. 3E can be seen when observed from above. As shown in FIG. 3F, the substrate surface except the columnar spacers 12 and regions 40 for forming connecting bumps is covered with the masking layer 31.

Figure 3G:
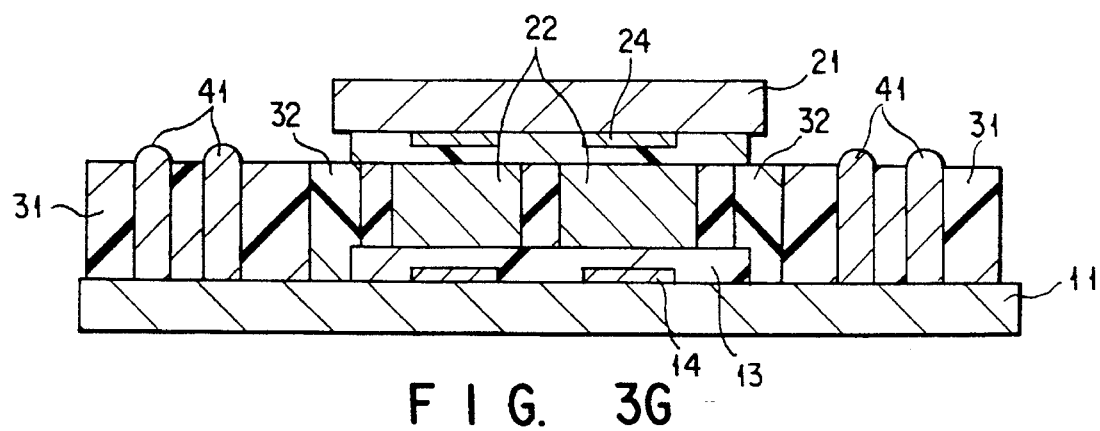

In the next step, the mutually facing substrates 21 and 11 were superposed one upon the other and, then, the clearance between these substrates was sealed, as shown in FIG. 3G. After the sealing, that portion of the second substrate which was positioned above the bump-forming region was cut away along the edge of the display pixel region. It should be noted that a sealant 32 was formed between the display pixel portion and the resist in the bump-forming region. The sealant 32 thus formed was dipped in a plating bath so as to form a bump 41 using as an electrode the short ring wiring 42 formed on the substrate 11. It should be noted that the step can be simplified because the masking layer need not be newly coated.

The bump can be formed of a metal such as aluminium, molybdenum, gold or copper. In this example, used was a gold bump. Also, the short ring is cut away in mounting a driving IC. In this example, the short ring is formed of a film forming the signal line or gate line of the liquid crystal display device. To be more specific, the short ring is of a Mo—Al laminate structure.

Figure 3H:
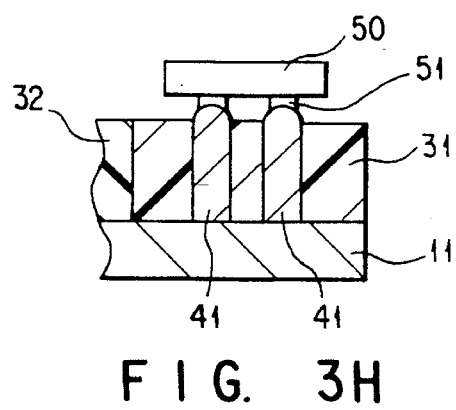

In the next step, an Al electrode 51 of an IC driving circuit 50 was connected to the bump 41 as shown in FIG. 3H so as to mount the control means to the liquid crystal display device, followed by assembling various parts so as to obtain a liquid crystal display device having a diagonal length of 6 inches.

In the resultant liquid crystal display device, a resist pattern of a height equal to that of the columnar spacer was formed not only in the pixel display area but also in the circuit mounting area outside the display area. As a result, the gap control capability was further improved. Specifically, the gap over the entire region of the liquid crystal display device having a diagonal length of 6 inches was as small as ±0.1 μm. What should also be noted is that tripropyleneglycol monomethyl ether was used as a developing solution in the second example. As a result, the surface of the alignment film after the rubbing treatment was free from swelling and dissolving, making it possible to obtain a uniform crystal orientation and, thus, to obtain an excellent picture image displayed on the screen. Further, the masking layer, which serves to protect the wiring, permits improving the reliability of the device.

In the device of the second example described above, the masking layer was left unremoved. However, the masking layer may be removed by dipping it in a peeling solution after the bump formation by plating.

In the manufacture of a liquid crystal display device, several pairs of glass substrates are generally superposed one upon the other and sealed in a single step. In this case, spacers are not formed in the periphery of the pixel region to which a driving IC is mounted, with the result that the glass is bent in the periphery of the pixel region. It follows that the gap is rendered uneven.

In the liquid crystal display device of the second example described above, a resin 31 is formed in the bump-forming region in the periphery of the pixel region to which a driving IC is mounted so as to suppress the bending of the glass and, thus, to suppress the unevenness of the gaps, leading to a liquid crystal display device of a high quality. In addition, the resin 31 and the columnar spacer 12 can be simultaneously formed by using a single mask in the second embodiment, leading to a low manufacturing cost of the device.

Let us describe a third example of the liquid crystal display device of the present invention. In this example, the columnar spacer was formed of an urethane-acrylic copolymer resin. The device of the third example was shaped like that in the first example. Thus, let us describe the third example with reference to FIGS. 2A to 2G.

In the first step, prepared was a first substrate 11 having a TFT and pixel electrodes 14 formed thereon in a matrix arrangement, as shown in FIG. 2A. The first substrate 11 was spin-coated at a speed of 2500 rpm with polyimide of a ring-closing type under heating, followed by baking at 100° C. for 15 minutes using a hot plate and, then, at 180° C. for one hour within a $N_2$ oven. A rubbing treatment was applied to the baked film to form an alignment film 13, as shown in FIG. 2B. Then, the alignment film 13 was spin-coated at a speed of 2500 rpm with a coating solution of urethane-acrylic copolymer, as shown in FIG. 2C, followed by heating at 80° C. for 20 minutes. The resultant film of the urethane-acrylic copolymer was selectively exposed to light via a mask, followed by development so as to form spacers 12 as shown in FIG. 2D.

The coating solution can be prepared as follows. In the first step, a polyurethane having a polymerization degree of about 2 to 100 is prepared by the polymerization reaction between diisocyanate and a dihydric alcohol. The resultant polyurethane is mixed with methyl acrylate at a mixing ratio (weight ratio) of 1 (polyurethane):100 (methyl acrylate). The mixture is then dissolved in xylene. In general, the polyurethane-acrylate mixing ratio should fall within a range of between 3:1 and 1:200 in view of the photosensitivity, resolution and mechanical strength of the resin. If the amount of the acrylate is unduly small, the photosensitivity and resolution of the resin are lowered. If the amount of the acrylate is unduly large, however, the resin fails to exhibit a mechanical strength required as a columnar spacer.

In the light exposure step, used was a parallel light having a maximum wavelength of 365 nm and an energy density of 50 mW/cm$^2$. In the developing step, a developing solution containing as a main component tripropyleneglycol monomethyl ether was sprayed for 60 seconds at a flow rate of 9 ml/min under a nitrogen gas pressure of 1.5 kg/cm$^2$, followed by rinsing with a flowing water for 60 seconds. Further, a spin-drying was applied for 20 seconds using a nitrogen gas.

As a result, columnar spacers 12 made of the urethane-acrylic copolymer were formed on the substrate, as shown in FIG. 2E. Further, the entire surface of the substrate was irradiated with an ultraviolet light having an energy density of 5 W/cm$^2$, followed by heating at 180° C. for 30 minutes so as to cure the resin completely. The resultant columnar spacer was found to be 5.0 μm in height and 15 μm in diameter.

Then, a second substrate 21 having a transparent electrode, a color filter and a black matrix formed thereon was coated with the alignment film 13, followed by applying an alignment treatment to the film 13. Further, a sealing material (not shown), which is curable upon ultraviolet light irradiation, was printed in the periphery of the substrate.

Figure 2G:
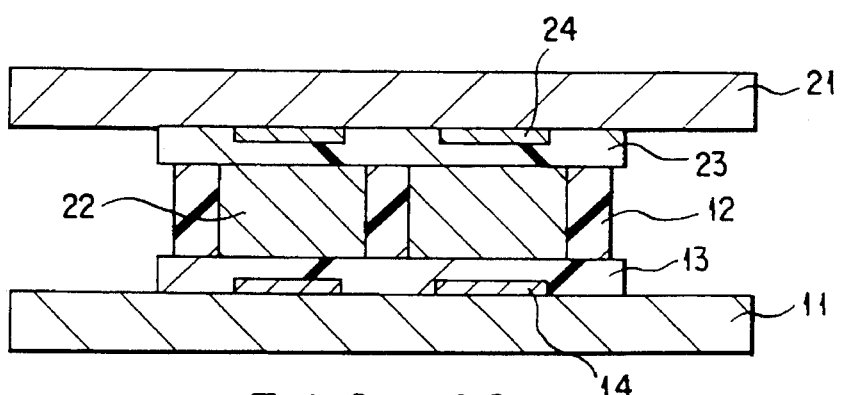

In the next step, the first substrate 11 was combined with the second substrate 21. Under this condition, an ultraviolet light was applied to the combined system put under a pressurized state so as to cure the sealing material and, thus, to form a cell, as shown in FIG. 2F. Further, a liquid crystal 22 was injected into the cell, followed by assembling a liquid crystal display element having a diagonal length of 9 inches, as shown in FIG. 2G.

In the resultant liquid crystal display device, gap over the entire region was as small as ±0.2 μm. Also, since tripropyleneglycol monomethyl ether was used as a developing solution, the surface of the alignment film after the rubbing treatment was free from swelling and dissolving. Thus, a uniform crystal orientation was obtained, leading to an excellent picture image displayed on the screen.

Let us describe a fourth example of the liquid crystal display device of the present invention. This example is equal to the first example, except that an ester-acrylic copolymer was used as a resin for forming the columnar spacer in the fourth example. The device of the fourth example was shaped like that in the first example. Thus, let us describe the fourth example with reference to FIGS. 2A to 2G.

In the first step, prepared was a first substrate 11 having a TFT and pixel electrodes 14 formed thereon in a matrix arrangement, as shown in FIG. 2A. The first substrate 11 was spin-coated at a speed of 2500 rpm with polyimide of a ring-closing type under heating, followed by baking at 100° C. for 15 minute using a hot plate and, then, at 180° C. for one hour within a $N_2$ oven. A rubbing treatment was applied to the baked film to form an alignment film 13, as shown in FIG. 2B.

In the next step, an ester-acrylic copolymer film was formed, followed by selectively exposing the copolymer film to light through a mask (FIG. 2C) to form a pattern of columnar spacers (FIG. 2D). Then, a developing treatment was applied so as to form spacers 12, as shown in FIG. 2E.

The ester-acrylic copolymer film is formed as follows. In the first step, a polyester having a polymerization degree of about 3 to 120 is prepared by polycondensation between terephthalic acid and ethylene glycol, followed by mixing the resultant polyester with methyl acrylate at a mixing ratio by weight of 1 (polyester):100 (methyl acrylate). Then, the mixture is dissolved in xylene. The resultant solution is spin-coated on the alignment film at a speed of 2500 rpm, followed by heating at 80° C. for 20 minutes. It is desirable to set the mixing ratio of the polyester to methyl acrylate to fall within a range of between 3:1 and 1:200 in view of the photosensitivity, resolution and mechanical strength of the resin.

In the light-exposure step, used was a parallel light having a maximum wavelength of 365 nm and an energy density of 50 mW/cm$^2$. Further, in the developing step, a developing solution containing as a main component tripropyleneglycol monomethyl ether was sprayed for 60 seconds at a flow rate of 9 ml/min under a nitrogen gas pressure of 1.5 kg/cm$^2$, followed by rinsing with a flowing water for 60 seconds and, then, spin-drying for 20 seconds using a nitrogen gas so as to form columnar spacers 12 made of the ester-acrylic copolymer resin on the substrate. The entire surface of the substrate was irradiated with an ultraviolet light having an energy density of 5 W/cm$^2$, followed by an additional heating at 180° C. for 30 minutes so as to cure completely the resin. The resultant columnar spacer 12 was found to be 5.0 μm in height and 15 μm in diameter.

In the next step, a second substrate 21 having a transparent electrode, a color filter and a black matrix formed thereon was coated with the alignment film 13, followed by applying an alignment treatment to the film 13. Then, a sealing material (not shown), which is curable upon irradiation with an ultraviolet light, was printed in the periphery of the substrate.

In the next step, the first substrate 11 was combined with the second substrate 21. Under this condition, an ultraviolet light was applied to the combined system put under a pressurized state so as to cure the sealing material and, thus, to form a cell, as shown in FIG. 2F. Further, a liquid crystal 22 was injected into the cell, followed by assembling a liquid crystal display element having a diagonal length of 9 inches, as shown in FIG. 2G.

In the resultant liquid crystal display device, gap over the entire region was as small as ±0.2 μm. Also, since tripropyleneglycol monomethyl ether was used as a developing solution, the surface of the alignment film after the rubbing treatment was free from swelling and dissolving. Thus, a uniform crystal orientation was obtained, leading to an excellent picture image displayed on the screen.

Let us describe a fifth example of the liquid crystal display device of the present invention. In this example, used was an ether-acrylic copolymer as a resin for forming the columnar spacer. The device of the fifth example was shaped like that in the first example. Thus, let us describe the fifth example with reference to FIGS. 2A to 2G.

In the first step, prepared was a first substrate 11 having a TFT and pixel electrodes 14 formed thereon in a matrix arrangement, as shown in FIG. 2A. The first substrate 11 was spin-coated at a speed of 2500 rpm with polyimide of a ring-closing type under heating, followed by baking at 100° C. for 15 minute using a hot plate and, then, at 180° C. for one hour within a $N_2$ oven. A rubbing treatment was applied to the baked film to form an alignment film 13, as shown in FIG. 2B.

In the next step, an ether-acrylic copolymer film was formed as shown in FIG. 2C, followed by selectively exposing the copolymer film to light through a mask to form a pattern of columnar spacers (FIG. 2D). Then, a developing treatment was applied so as to form spacers, as shown in FIG. 2E.

The ether-acrylic copolymer film is formed as follows. In the first step, ethylene glycol and methyl acrylate are mixed at a mixing ratio by weight of 1 (ethylene glycol):3 (methyl acrylate), followed by dissolving the mixture in xylene. The resultant solution is spin-coated on the alignment film at a speed of 2500 rpm, followed by heating at 80° C. for 20 minutes. It is desirable to set the mixing ratio of ethylene glycol to methyl acrylate to fall within a range of between 3:1 and 1:200 in view of the photosensitivity, resolution and mechanical strength of the resin.

In the light-exposure step, used was a parallel light having a maximum wavelength of 365 nm and an energy density of 50 mW/cm$^2$. Further, in the developing step, a developing solution containing as a main component tripropyleneglycol monomethyl ether was sprayed for 60 seconds at a flow rate of 9 ml/min under a nitrogen gas pressure of 1.5 kg/cm$^2$, followed by rinsing with a flowing water for 60 seconds and, then, spin-drying for 20 seconds using a nitrogen gas so as to form columnar spacers 12 made of the ether-acrylic copolymer resin on the substrate. The entire surface of the substrate was irradiated with an ultraviolet light having an energy density of 5 W/cm$^2$, followed by an additional heating at 180° C. for 30 minutes so as to cure completely the resin. The resultant columnar spacer 12 was found to be 5.0 μm in height and 15 μm in diameter.

In the next step, a second substrate 21 having a transparent electrode, a color filter and a black matrix formed thereon was coated with the alignment film 13, followed by applying an alignment treatment to the film 13. Then, a sealing material (not shown), which is curable upon irradiation with an ultraviolet light, was printed in the periphery of the substrate.

In the next step, the first substrate 11 was combined with the second substrate 21. Under this condition, an ultraviolet light was applied to the combined system put under a pressurized state so as to cure the sealing material and, thus, to form a cell, as shown in FIG. 2F. Further, a liquid crystal 22 was injected into the cell, followed by assembling a liquid crystal display element having a diagonal length of 9 inches, as shown in FIG. 2G.

In the resultant liquid crystal display device, gap over the entire region was as small as ±0.2 μm. Also, since tripropyleneglycol monomethyl ether was used as a developing solution, the surface of the alignment film after the rubbing treatment was free from swelling and dissolving. Thus, a uniform crystal orientation was obtained, leading to an excellent picture image displayed on the screen.

Let us describe a sixth example of the liquid crystal display device of the present invention. In this example, used was a polyimide-acrylic copolymer i.e., as a resin for forming the columnar spacer. The device of the sixth example was shaped like that in the first example. Thus, let us describe the sixth example with reference to FIGS. 2A to 2G.

In the first step, prepared was a first substrate 11 having a TFT and pixel electrodes 14 formed thereon in a matrix arrangement, as shown in FIG. 2A. The first substrate 11 was spin-coated at a speed of 2500 rpm with polyimide of a ring-closing type under heating, followed by baking at 100° C. for 15 minute using a hot plate and, then, at 180° C. for one hour within a $N_2$ oven. A rubbing treatment was applied to the baked film to form an alignment film 13, as shown in FIG. 2B.

In the next step, a polyimide-acrylic copolymer film was formed as shown in FIG. 2C, followed by selectively exposing the copolymer film to light through a mask to form a pattern of columnar spacers (FIG. 2D). Then, a developing treatment was applied so as to form spacers, as shown in FIG. 2E.

The polyimide-acrylic copolymer film is formed as follows. In the first step, a polyamic acid having a polymerization degree of about 3 to 50 is mixed with methyl acrylate at a mixing ratio by weight of 1 (polyamic acid):50 (methyl acrylate), followed by dissolving the mixture in xylene. The resultant solution is spin-coated on the alignment film at a speed of 2500 rpm, followed by heating at 80° C. for 20 minutes. It is desirable to set the mixing ratio by weight of the polyamic acid to methyl acrylate to fall within a range of between 1:1 and 1:200. If the amount by weight of methyl acrylate is smaller than that of polyamic acid, the resin is rendered insoluble in a developing solution which does not impair the rubbing effect of the alignment film and, thus, is incapable of development. On the other hand, if the amount of methyl acrylate is more than 200 times as much as that of polyamic acid, it is impossible to obtain a hardness required as a columnar spacer. In the light-exposure step, used was a parallel light having a maximum wavelength of 365 nm and an energy density of 50 mW/cm$^2$. Further, in the developing step, a developing solution containing as a main component tripropyleneglycol monomethyl ether was sprayed for 60 seconds at a flow rate of 9 ml/min under a nitrogen gas pressure of 1.5 kg/cm$^2$, followed by rinsing with a flowing water for 60 seconds and, then, spin-drying for 20 seconds using a nitrogen gas so as to form columnar spacers 12 made of the polyimide-acrylic copolymer resin on the substrate. The entire surface of the substrate was irradiated with an ultraviolet light having an energy density of 5 W/cm$^2$, followed by an additional heating at 180° C. for 30 minutes so as to cure completely the resin. The resultant columnar spacer 12 was found to be 5.0 μm in height and 15 μm in diameter.

In the next step, a second substrate 21 having a transparent electrode, a color filter and a black matrix formed thereon was coated with the alignment film 13, followed by applying an alignment treatment to the film 13. Then, a sealing material (not shown), which is curable upon irradiation with an ultraviolet light, was printed in the periphery of the substrate.

In the next step, the first substrate 11 was combined with the second substrate 21. Under this condition, an ultraviolet light was applied to the combined system put under a pressurized state so as to cure the sealing material and, thus, to form a cell, as shown in FIG. 2F. Further, a liquid crystal 22 was injected into the cell, followed by assembling a liquid crystal display element having a diagonal length of 9 inches, as shown in FIG. 2G.

In the resultant liquid crystal display device, gap over the entire region was as small as ±0.2 μm. Also, since tripropyleneglycol monomethyl ether was used as a developing solution, the surface of the alignment film after the rubbing treatment was free from swelling and dissolving. Thus, a uniform crystal orientation was obtained, leading to an excellent picture image displayed on the screen.

Let us describe a seventh example of the liquid crystal display device of the present invention. In this example, used was an epoxy-acrylic copolymer for forming the columnar spacer. The device of the seventh example was shaped like that in the first example. Thus, let us describe the seventh example with reference to FIGS. 2A to 2G.

In the first step, prepared was a first substrate 11 having a TFT and pixel electrodes 14 formed thereon in a matrix arrangement, as shown in FIG. 2A. The first substrate 11 was spin-coated at a speed of 2500 rpm with polyimide of a ring-closing type under heating, i.e., LC-102 (HITACHI KASEI Inc.), followed by baking at 100° C. for 15 minute using a hot plate and, then, at 180° C. for one hour within a $N_2$ oven. A rubbing treatment was applied to the baked film to form an alignment film 13, as shown in FIG. 2B.

In the next step, an epoxy-acrylic copolymer film was formed as shown in FIG. 2C, followed by selectively exposing the copolymer film to light through a mask to form a pattern of columnar spacers (FIG. 2D). Then, a developing treatment was applied so as to form spacers, as shown in FIG. 2E.

The epoxy-acrylic copolymer film is formed as follows. In the first step, a prepolymer having a relatively small molecular weight of about 300 to 8000, which is synthesized by the reaction between bisphenol A and epichlorohydrin, is mixed with methyl acrylate at a mixing ratio by weight of 1 (prepolymer):150 (methyl acrylate), followed by dissolving the mixture in cellosolve acetate. The resultant solution is spin-coated on the alignment film 13 at a speed of 2500 rpm, followed by heating at 80° C. for 20 minutes. It is desirable to set the mixing ratio by weight of the prepolymer to methyl acrylate to fall within a range of between 3:1 and 1:200 in view of the photosensitivity, resolution and mechanical strength of the resin.

In the light-exposure step, used was a parallel light having a maximum wavelength of 365 nm and an energy density of 50 mW/cm$^2$. Further, in the developing step, a developing solution containing as a main component tripropyleneglycol monomethyl ether was sprayed for 60 seconds at a flow rate of 9 ml/min under a nitrogen gas pressure of 1.5 kg/cm$^2$, followed by rinsing with a flowing water for 60 seconds and, then, spin-drying for 20 seconds using a nitrogen gas so as to form columnar spacers 12 made of the epoxy-acrylic copolymer resin on the substrate. The entire surface of the substrate was irradiated with an ultraviolet light having an energy density of 5 W/cm$^2$, followed by an additional heating at 180° C. for 30 minutes so as to cure completely the resin. The resultant columnar spacer 12 was found to be 5.0 μm in height and 15 μm in diameter.

In the next step, a second substrate 21 having a transparent electrode, a color filter and a black matrix formed thereon was coated with the alignment film 13, followed by applying an alignment treatment to the film 13. Then, a sealing material (not shown), which is curable upon irradiation with an ultraviolet light, was printed in the periphery of the substrate.

In the next step, the first substrate 11 was combined with the second substrate 21. Under this condition, an ultraviolet light was applied to the combined system put under a pressurized state so as to cure the sealing material and, thus, to form a cell, as shown in FIG. 2F. Further, a liquid crystal 22 was injected into the cell, followed by assembling a liquid crystal display element having a diagonal length of 9 inches, as shown in FIG. 2G.

In the resultant liquid crystal display device, gap over the entire region was as small as ±0.2 µm. Also, since tripropyleneglycol monomethyl ether was used as a developing solution, the surface of the alignment film after the rubbing treatment was free from swelling and dissolving. Thus, a uniform crystal orientation was obtained, leading to an excellent picture image displayed on the screen.

It is desirable to form columnar spacers on the black matrix such as a wiring, though where to form the columnar spacers is not specifically referred to in conjunction with any of the examples described above. It should also be noted that the resin used is originally colored in some cases. Where a colored resin is used for forming the columnar spacer on the TFT, the spacer can also be used as a shielding means for protecting the TFT from light.

As described above in detail, the columnar spacer is formed in the present invention by using an acrylic resin in combination with at least one material selected from the group consisting of an epoxy compound, a polyimide precursor, methoxy ether, a polyester precursor and an urethane compound, making it possible to use a developing solution which does not cause the surface of the polyimide alignment film to be swollen or dissolved. It follows that the effect of the rubbing treatment is maintained even after the step of forming the columnar spacer, leading to a marked improvement in the display quality of the liquid crystal display device.

Figure 4:
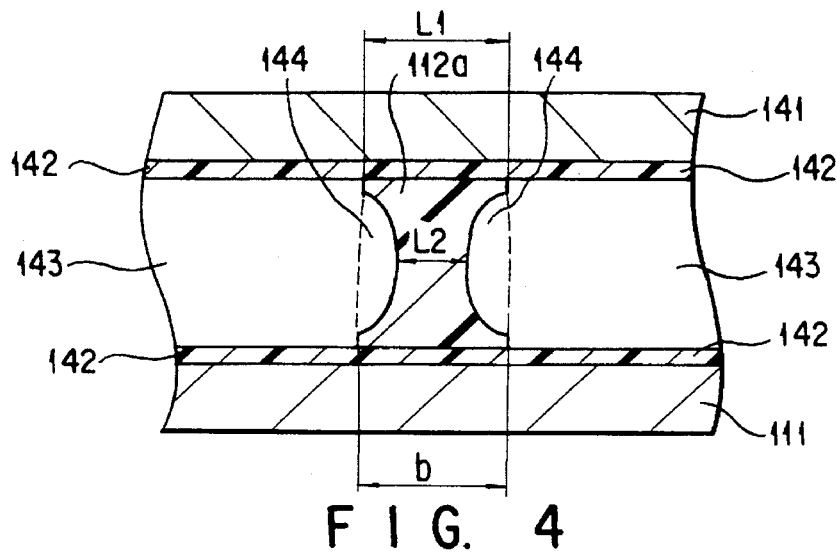
FIGS. 4 to 7 are cross sectional views collectively showing a first modification of the liquid crystal display device having an improved spacing means.

FIG. 4 schematically shows a liquid crystal display device of the present invention having a first modification incorporated therein in respect of the spacing means. As shown in the drawing, the spacing means is made thinner in the central portion than in the both end portions. To be more specific, the width L2 of the cross section in the central portion of the columnar spacer is smaller than the width L1 in the upper or lower end portion. It is desirable to make the width L2 as small as possible, as far as the columnar spacer exhibits a mechanical strength high enough to ensure uniformly the required gap between the two substrates accurately. It has been found that the effect of suppressing the light leakage can be recognized if the ratio L2/L1 is not larger than 0.95, i.e., L2/L1≦0.95. In order to obtain a prominent effect, the ratio should desirably be: L2/L1≦0.8.

In the modification shown in FIG. 4, it may be reasonable to understand that the mechanical strength of the columnar spacer will be lowered because the central portion of the spacer is thinner than the end portions. However, where the width L2 was set at 3 to 200 µm and the ratio L2/L1 was set smaller than 0.4, i.e., L2/L1<0.4, in the case of using a photosensitive acrylic polymer for forming the columnar spacer, the columnar spacer was found to exhibit a sufficient mechanical strength when load was applied to the substrate so as to perform its gap control function satisfactorily, compared with the case where the ratio L2/L1 was set at 1, i.e., a columnar spacer which did not include a thinner central portion.

Let us describe how to manufacture the liquid crystal display device of the present invention comprising the first modification of the spacing means with reference to FIGS. 4 to 7.

Figure 5:
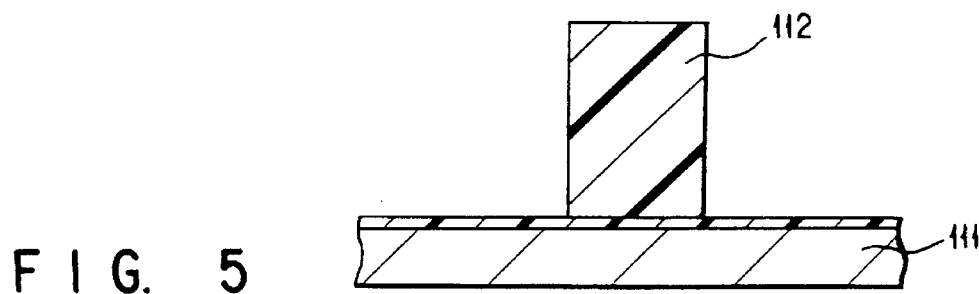

In the first step, a first substrate 111 having a TFT and pixel electrodes arranged thereon in a matrix arrangement and an alignment film 142 formed thereon was spin-coated with a photosensitive mixture solution of 9-oxyranylnonylacrylate, IRGA CURE 907, and diacetonealcohol (10:0.5:50) at a speed of 2000 rpm, followed by a pre-baking at 110° C. for 15 minute using a hot plate. The epoxy acrylate film thus formed was selectively exposed to light through a mask to form a pattern of columnar spacers, followed by applying a developing treatment. In the light-exposing step, used was a parallel light having a maximum wavelength of 365 nm and an energy density of 380 mW/cm². In the developing step, a developing solution consisting of methylene chloride was sprayed onto the epoxy acrylate at a flow rate of 9 ml/min and under a nitrogen gas pressure of 1.5 kg/cm². The treatment with the developing solution was performed for 240 seconds, followed by a treatment with a mixture of the developing solution and a rinsing water for 10 seconds and, then, by a rinsing with a rinsing water for 10 seconds. Further, a spin drying was applied for 20 seconds using a nitrogen gas so as to form an epoxy acrylate column 112 on the alignment film 142 formed on the substrate 111 as shown in FIG. 5.

Figure 6:
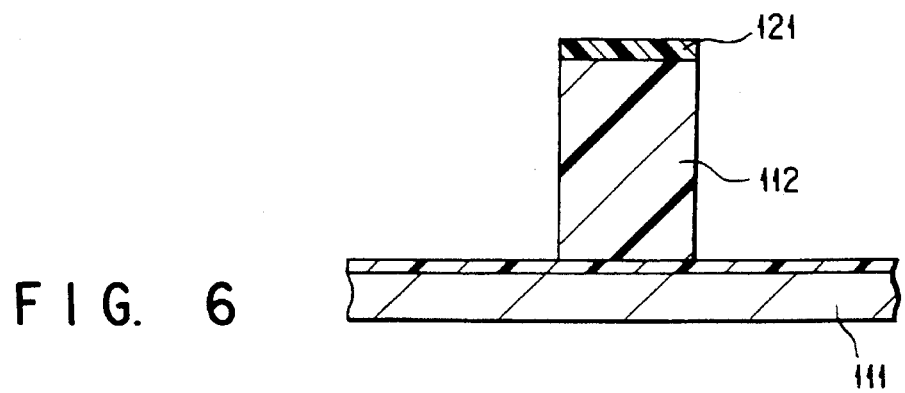

In the next step, the substrate 111 was coated with resist Novolak type resist OFPR-5000 (TOKYO OHKA Inc.), followed by exposure to light and development by the ordinary photolithographic process so as to form a resist film 121 on the column 112, as shown in FIG. 6. The mask used in the step of forming the column 112 shown in FIG. 5 can also be used in this step as a photomask.

Figure 7:
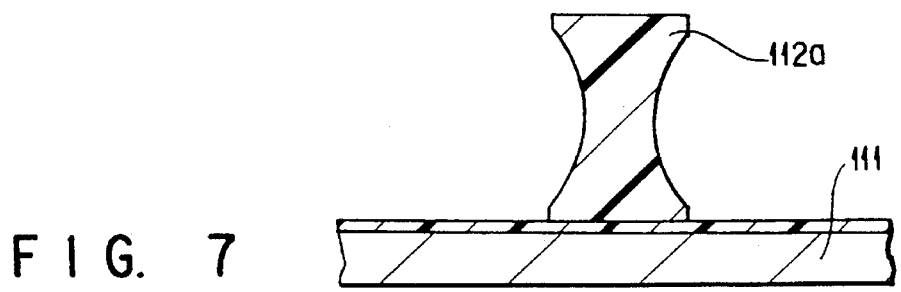

Then, the column 112 capped with the resist film 121 was dipped in a mixture solution of butyl benzene sulfonate and xylene (3:7) of 60° C. for one minute, with the result that the side surface of the column made of epoxy acrylate was etched so as to make the column thinner in the central portion than in the upper and lower end portions. The resultant structure was put in an oven and cured at 250° C. for one hour so as to evaporate the residual solvent and, thus, to form a columnar spacer 112a in which the central portion was thinner than the upper and lower end portions as shown in FIG. 7. The columnar spacer 112 thus formed was found to be 5.0 µm in height, 15 µm in the diameter of each of the upper and lower ends, and 11 µm in the diameter of the narrowest region in the central portion.

The resist film 121 is formed of a material differing from the photosensitive resin used for forming the columnar spacer 112a. Also, the resist material should not be dissolved in a solvent used for etching the column 112, and vice versa. The resist material satisfying these requirements includes, for example, positive cresol novolak type resist, negative butadien rabber type resist, negative cinnamic acid type resist.

The liquid crystal display device shown in FIG. 4 comprises the spacer 112a formed by the method described above. In manufacturing the particular liquid crystal display device, the surface of a first substrate 111 was coated by a roll coater with a 5% solution of a polyimide, followed by heating at 200° C. for one hour. Then, the surface of the resultant polyimide film was rubbed with a roller having a cloth mounted thereto so as to perform a rubbing treatment so as to form an alignment film 142. The columnar spacer 112a was formed by the method described above.

In the next step, prepared was a second substrate 141 having a transparent electrode, a color filter and a black matrix formed thereon. The second substrate 141 was coated with the alignment film 142, followed by an alignment treatment and, then, by printing of a sealing material (not shown) along the periphery of the second substrate. Then, the first substrate 111 was combined with the second substrate 141. Under this condition, the sealing material was cured by heating under a pressurized state so as to form a cell. Further, a liquid crystal was injected into the cell, followed by assembling a liquid crystal display element having a diagonal length of 4 inches so as to manufacture the liquid crystal display device, as shown in FIG. 4. In the resultant liquid crystal display device, the gap over the entire region of the liquid crystal element having a diagonal length of 4 inches was found to be as accurate as ±0.1 μm.

When it comes to the columnar spacer having a diameter of 15 μm, which was formed by the conventional method, however, a disturbed region of the crystal orientation was formed around the columnar spacer, said disturbed region having a diameter of 24 μm. As a result, the display quality of the device was much lowered. In the case of, for example, a normally black mode display, a light leakage took place in the disturbed region of the crystal orientation, giving rise to a white dot having a diameter of 24 μm in the spacer portion. Further, the contrast in this case was 50:1.

In the liquid crystal display device of the present invention shown in FIG. 4, however, a column having a diameter of 15 μm was formed first, followed by an etching treatment to make the central portion of the column thinner than the upper and lower end portions. In this case, the disturbed region of the crystal orientation in question is positioned within the recessed portion formed in the central portion of the columnar spacer. A liquid crystal display device comprising the particular liquid crystal cell was actually manufactured. When a picture image was displayed on the screen of the display device in a normally black mode, the region of the light leakage caused by the disturbed crystal orientation was found to be 15 μm in diameter. In other words, the light leakage in the periphery of the columnar spacer was markedly suppressed, leading to such a high contrast as 100:1 and, thus, to an excellent picture image displayed on the screen.

In the case of using a photosensitive resin for forming the columnar spacer as in the liquid crystal display device shown in FIG. 4, it is desirable to arrange the columnar spacers at a density of 0.05 to 700/mm$^2$. Also, in the first modification shown in FIG. 4, the cross section of the columnar spacer perpendicular to the substrate is shaped such that the central portion of the spacer is thinner than the upper and lower end portions so as to produce the prominent effect described above. On the other hand, it is desirable for the cross section of the columnar spacer parallel with the substrate to be circular or elliptical, though it is also possible for the particular cross section to be polygonal such as rectangular, oblong or triangular.

To reiterate, in the columnar spacer of the first modification shown in FIG. 4, the central portion in the vertical direction is made thinner than the upper and lower end portions. In other words, the columnar spacer is recessed in the central portion, making it possible to have the disturbed region of the crystal orientation around the columnar spacer positioned within the recessed portion. Particularly, the broadest region of disturbance of the crystal orientation can be positioned within the recessed portion in the central portion of the columnar spacer, making it possible to suppress the expansion of the disturbed region of the crystal orientation. It follows that it is possible to suppress the difficulties brought about during operation of the liquid crystal display device by the disturbance of the liquid crystal orientation. Specifically, it is possible to diminish sufficiently the area of the black dot during operation under the normally white mode and the area of the white dot (light leakage) during operation under the normally black mode, leading to an improved display quality of the device.

FIG. 8 shows a second modification of the spacing means used in the present invention. In forming the spacing means of the second modification, an alignment film 142 was formed as in the first modification on a first substrate 111 having a TFT and pixel electrodes formed thereon in a matrix arrangement, followed by spin-coating a mixture solution of polyether (polyethyleneglycol)-trilenediisocyanate-2-hydroxy ethyl methacrylate, IRGA CURE-907 and ethyl lactate (10:2:35) at a speed of 2000 rpm and subsequently pre-baking the acrylate film at 60° C. for 15 minute by using a hot plate. The resultant urethane acrylate film was selectively exposed to light through a mask in a pattern of columnar spacers, followed by a developing treatment to form columns of the acrylate. Used in the light-exposure step was a parallel light having a maximum wavelength of 365 nm and an energy density of 100 mW/cm$^2$. On the other hand, the developing treatment was carried out by means of a spray development, i.e., spraying of a developing solution consisting of butyl acetate onto the epoxy acrylate film after the light exposure. The developing treatment was followed by a spin drying for 20 seconds using a nitrogen gas. Then, the dried system was put in an oven. The oven temperature was linearly elevated from room temperature to 400° C. over a period of 2 hours, followed by keeping the oven temperature at 400° C. for 30 minutes so as to carry out polymerization of the epoxy acrylate. As a result, the column was shrunk inward so as to form columnar spacers 112b.

The resultant columnar spacer 112b was found to be 5.0 μm in height and 15 μm in the diameter L1 of the upper end surface. As shown in FIG. 8, the narrowest portion of the columnar spacer 112 was formed by the shrinking at a region somewhat below the center in the vertical direction of the columnar spacer 112b. The diameter L2 of the narrowest portion was found to be 12 μm, and the distance L3 of the narrowest portion from the first substrate was found to be 3 μm.

A liquid crystal display element having a diagonal length of 4 inches was assembled as shown in FIG. 9, as in the first modification, by using the first substrate having the columnar spacers 112b formed thereon as described above. According to the second modification, the gap over the entire region of the liquid crystal element having a diagonal length of 4 inches was found to be as accurate as ±0.2 μm. Also, the region of the light leakage around the columnar spacer was found to be 17 μm in diameter. Further, the contrast was as high as 80:1 so as to achieve a good picture image display.

As apparent from the second modification, a satisfactory effect can be obtained even if the narrowest portion is not positioned in the center of the columnar spacer. According to the experiment conducted by the present inventors, a sufficient effect can be obtained if the length L3 shown in FIG. 8 falls within a range of between 1 μm and 4 μm in the case where the cell gap is 5 μm.

FIGS. 10 and 11 collectively show a third modification of the spacing means used in the present invention. In the third modification, a liquid crystal cell was prepared as in the first modification except for the method of forming columnar spacers.

Specifically, an alignment film 142 was formed as in the first modification on a first substrate 114 having a TFT and pixel electrodes formed thereon in a matrix arrangement, followed by spin-coating a mixture solution of 1-(etoxycarbonyl)ethyl acrylate, IRGA CURE-907 and butylacetate (5:1:6) at a speed of 3000 rpm and subsequently pre-baking the acrylate coating at 75° C. for 35 minutes using a hot plate so as to form a photo-setting acrylate film. The resultant polyester acrylate film was selectively exposed to light through a mask in the pattern of columnar spacers, followed by a developing treatment so as to form columns of epoxy acrylate. In the light exposing step, used was a parallel light having a maximum wavelength of 365 nm and an energy density of 100 mW/cm$^2$. On the other hand, a spray development was employed for the developing treatment. To be more specific, a developing solution was sprayed for 15 seconds onto the acrylate film after the light exposure, a mixture of the developing solution and rinse solution was applied for 10 seconds, and then rinse solution consists of isopropanol was applied for 10 seconds, the resultant film was placed under N$_2$ atmosphere.

The resultant system was put in an oven, followed by rapidly elevating the oven temperature from room temperature to 400° C. over a short period of 20 minutes, followed by keeping the oven temperature at 400° C. for 30 minutes. As a result, the column of the epoxy acrylate was shrunk inward so as to form a recessed portion in each of the upper surface and the side wall and, thus, to form a columnar spacer 112c, as shown in FIG. 10. The resultant columnar spacer 112c was found to be 5.2 μm in height, 15 μm in diameter L1 at the lower end, and 12 μm in diameter L2 in the narrowest portion in the center of the columnar spacer 112c.

A liquid crystal display element having a diagonal length of 4 inches was assembled as shown in FIG. 11, as in the first modification, by using the first substrate having the columnar spacers 112c formed thereon as described above. According to the third modification, the gap over the entire region of the liquid crystal element was found to be as accurate as ±0.2 μm. Also, the region of the light leakage around the columnar spacer was found to be 17 μm in diameter. Further, the contrast was as high as 80:1 so as to achieve a good picture image display.

The third modification utilizes the phenomenon that a resin is shrunk inward when heated rapidly so as to make the columnar spacer thinner in the central portion than in the upper and lower end portions. The particular technique permits eliminating the masking step with a photoresist material and the etching step, leading to reduction in the manufacturing cost of the liquid crystal display device.

What should also be noted is that the end portion in contact with the substrate of the columnar spacer is also recessed in the third modification, with the result that the liquid crystal positioned within the recessed portion serves to scatter the light. It follows that the light leakage around the spacer portion can be markedly suppressed during operation under the normally black mode, leading to a marked improvement in the display quality of the liquid crystal display device.

FIGS. 12 and 13 collectively show a fourth modification of the spacing means used in the present invention. In this modification, the shape of the columnar spacer was modified. On the other hand, the columnar spacer and the liquid crystal cell were prepared as in the first modification.

In the fourth modification, an alignment film 142 was formed on each of a first substrate 111 and a second substrate 141 as in the first modification, followed by forming a columnar spacer 112d having a trapezoid vertical cross section as shown in FIG. 12 on each of these first substrate and second substrates 111 and 141. A method for producing the columnar spacer 112d comprises the steps of a resin layer is formed on the center portion of the top surface of the columnar spacer 112 obtained by the method similar to that of the first modification as shown in FIG. 5, subjecting the spacer 112 to developing by using a developing agent to each the edge portion of the surface and the side wall of the columnar spacer 112. The resin and the developing agent used in the fourth modification similar to that used in the third modification. Then, these first and second substrates were superposed one upon the other such that the columnar spacers were aligned with each other, followed by preparing as in the first modification a liquid crystal display element having columnar spacers each having the thinnest portion in the center in the vertical direction as shown in FIG. 13. Clearly, the thinnest portion noted above corresponds to L2 referred to previously in conjunction with the first modification.

The liquid crystal display device thus prepared was found to permit suppressing the light leakage around the columnar spacer, making it possible to achieve a good picture image display.

FIGS. 14A to 14D and 15 collectively show a fifth modification of the spacing means used in the present invention. In the fifth modification, columnar spacers and a liquid crystal cell were manufactured as in the first modification, except that the fifth modification differed from the first modification in the shape of the columnar spacer.

Specifically, columnar spacers 112e were formed on each of the first substrate 111 and the second substrate 141 such that the columnar spacer was rendered thinner stepwise toward the center of the liquid crystal layer, as shown in FIGS. 14A to 14D and 15.

Figure 14A:
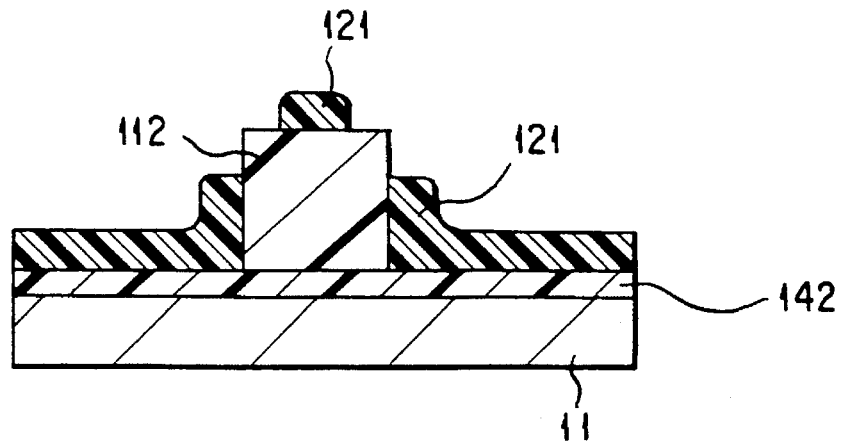
FIGS. 14A to 14D and 15 are cross sectional views collectively showing a fifth modification of the liquid crystal display device having an improved spacing means.
Figure 14B:
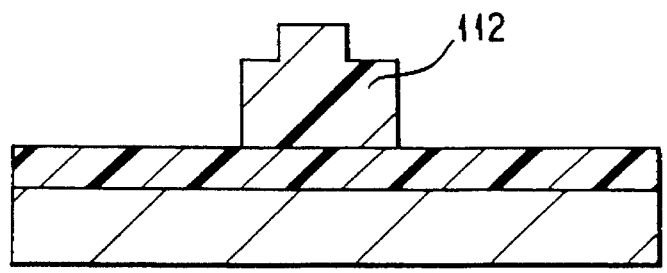

In the first step, an epoxy acrylate column 112 was formed in a method similar to that of the first modification shown in FIG. 5. A resist film 121 was formed on both an alignment film 142 and the column 112, except for the edge of the top surface of the column 112, as shown in FIG. 14A. Thereafter, the column 112 was developed by use of a developing solution such as a mixture of butylbenzene sulfonic acid and xylene (3:7) with being immersed in the solution at 70° C. for 10 minutes, and removed the resist film 121, with the result that the resultant column 112 had a long-diameter portion and a short-diameter portion, as shown in FIG. 14B.

Figure 14C:
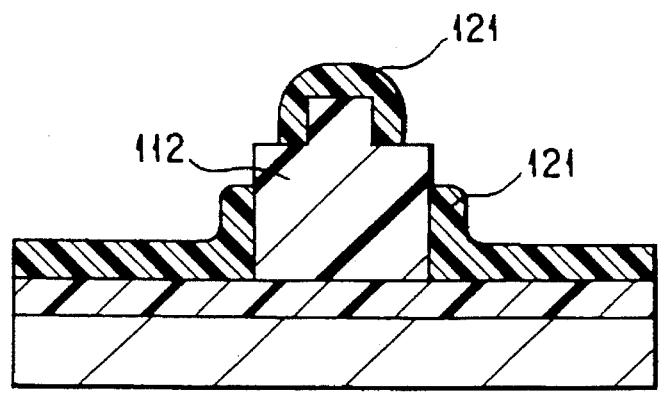
Figure 14D:
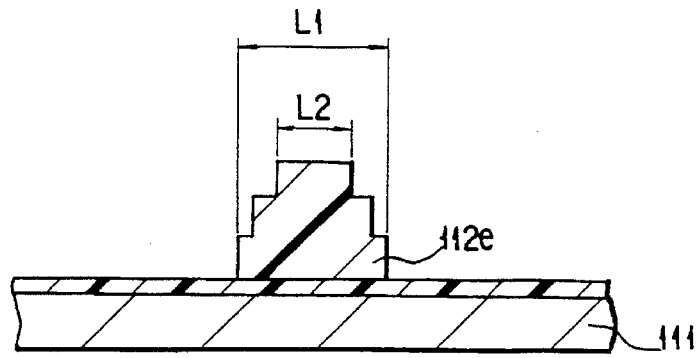

Subsequently, another resist film 121 was formed on both the column 112 and the alignment film 142, except for the edge of the long-diameter portion of the column 112, as shown in FIG. 14C. Thereafter, the column 112 was developed, the resist film was removed, and then the column with the result that the column 112 had a long-diameter portion, a short-diameter portion and an intermediate-diameter portion, as shown in FIG. 14D.

Figure 15:
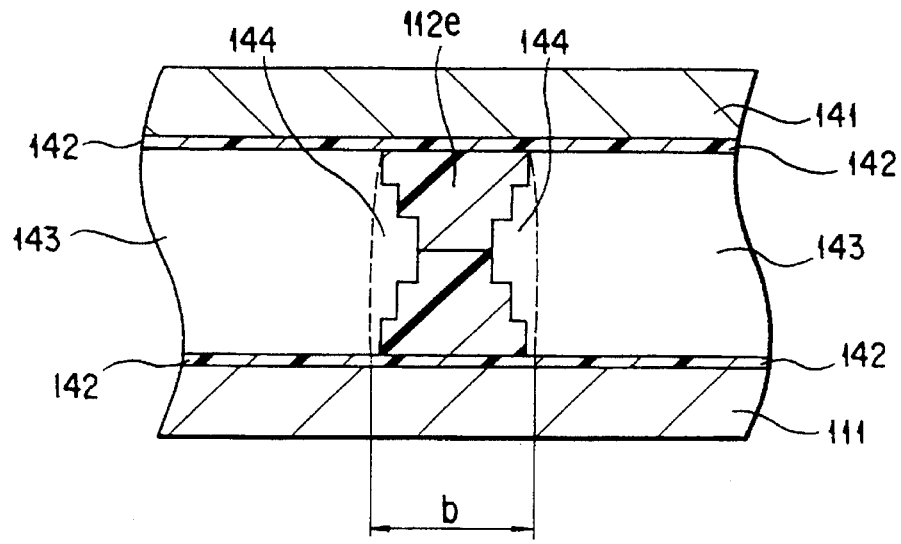

In the next step, the first and second substrates 111 and 141 were superposed one upon the other such that the columnar spacers 112e were aligned with each other, followed by preparing as in the fourth modification a liquid crystal display element as shown in FIG. 15. Clearly, the length in the thinnest central portion of the columnar spacer 112e corresponds to L2 referred to previously in conjunction with the first modification. The liquid crystal display element thus prepared was found to permit suppressing the light leakage around the columnar spacer, leading to a satisfactory picture image displayed on the screen.

FIGS. 16 to 19 collectively show a sixth modification of the spacing means used in the present invention. In the sixth modification, a liquid crystal cell was manufactured as in the first example except for the method of preparing the columnar spacer. Specifically, the columnar spacer was prepared in the sixth modification, as follows.

Figure 16:
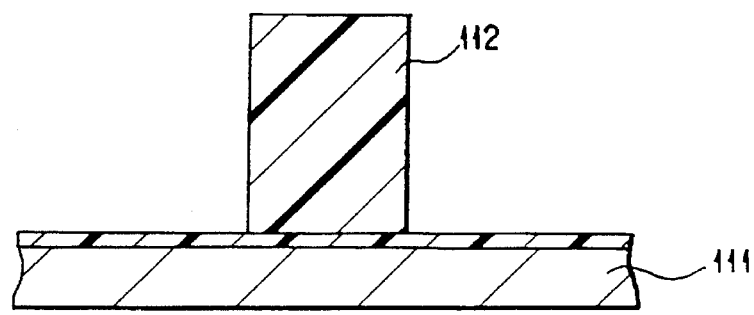
FIGS. 16 to 19 are cross sectional views collectively showing a sixth modification of the liquid crystal display device having an improved spacing means.

In the first step, a first substrate 111 having a TFT and pixel electrodes formed thereon in a matrix arrangement was spin-coated with a mixture solution of 1-methyl-2-(1-pyrolydinyl ethylacrylate, IRGA CURE-907, and propanol (10:1:100) at a speed of 2000 rpm, followed by pre-baking the coated film at 110° C. for 15 minute by using a hot plate. Then, the resultant polyimide acrylate film was selectively exposed to light through a mask to form a latent pattern of columnar spacers, followed by developing the latent pattern. In the light exposure step, used was a parallel light having a maximum wavelength of 365 nm and an energy density of 380 mW/cm$^2$. On the other hand, the developing treatment was carried out by spraying a developing solution against the photosensitive epoxy acrylate film after the light exposure at a flow rate of 9 ml/min and under a nitrogen gas pressure of 1.5 kg/cm$^2$. The developing treatment was followed by a rinsing treatment and, then, a drying treatment. To be more specific, the photosensitive acrylate film after the light exposure was treated for 240 seconds with a developing solution, for 10 seconds with a mixture of the developing solution and a rinsing water, for 10 seconds with the rinsing water and, then, was dried for 20 seconds by means of spin drying using a nitrogen gas, so as to form acrylate columns 112 on the substrate, as shown in FIG. 16.

Figure 17:
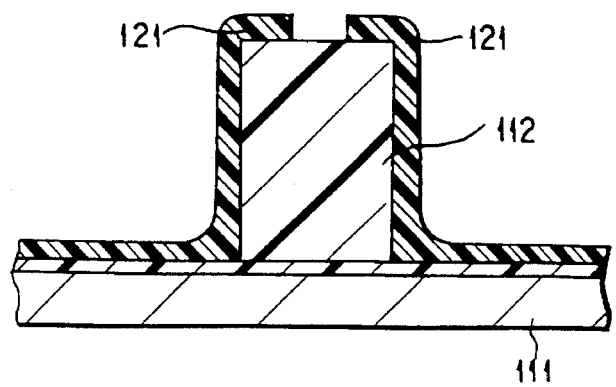

In the next step, the substrate 111 was coated with a resist, followed by a light exposure and development by the ordinary photolithographic technique so as to form a resist pattern 121, which was open in the center, on the upper end surface of the column 112 and the side wall thereof, as shown in FIG. 17. Clearly, the steps involved in the formation of the resist pattern 121 are equal to those in the first modification.

After formation of the resist pattern 121, the resultant system was dipped for one minute in a mixture solution butyl benzene sulfonate and xylene (3:7) of 60° C., with the result that the polyimide exposed to the mixture solution through the central opening of the resist pattern 121 was dissolved in the mixture solution. As a result, the upper end surface of the column 112 was recessed in the central portion.

Figure 18:
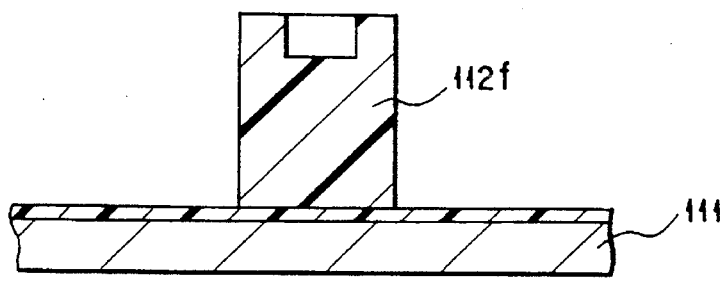

Then, the substrate was cured at 250° C. for one hour within an oven so as to remove by evaporation the residual solvent and, thus, to form a columnar spacer 112$f$ having a recessed upper surface, as shown in FIG. 18. The columnar spacer 112$f$ was found to be 5.0 μm in height and 15 μm in diameter. Further, the recessed portion in the upper end surface of the columnar spacer 112$f$ was found to be 10 μm in diameter and 2 μm in depth.

Figure 19:
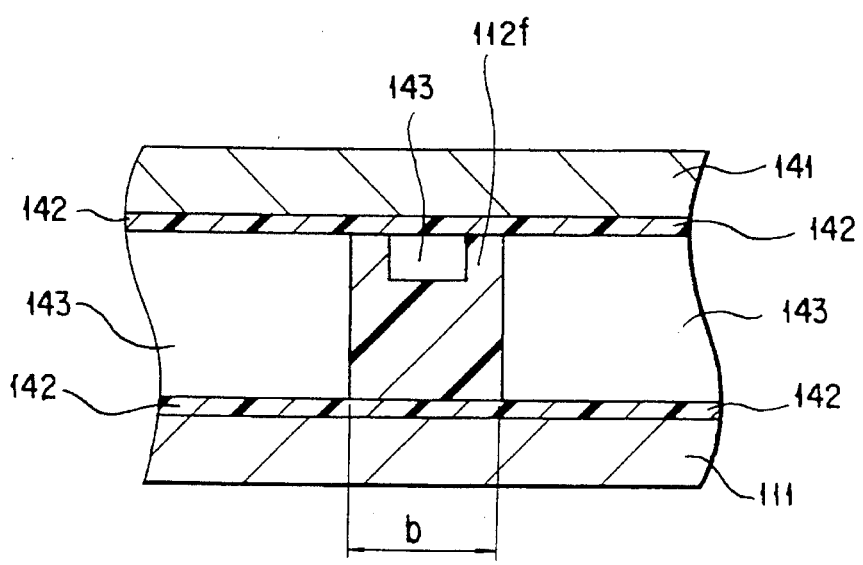

A liquid crystal display device was prepared by using the first substrate 111 having the columnar spacers 112$f$ formed thereon as described above. Specifically, a second substrate 141 having a transparent electrode, a color filter and a black matrix formed thereon in advance was coated with an alignment film 142, followed by applying an alignment treatment to the film 142 and subsequently printing a sealant (not shown) around the substrate. Then, the first substrate 111 and the second substrate 141 were combined, and the sealant was cured by heating under a pressurized condition so as to prepare a cell, followed by injecting a liquid crystal 143 so as to obtain a liquid crystal display device having a diagonal length of 4 inches, as shown in FIG. 19.

An epoxy resin curable at room temperature was used as the sealant in the six modification described above. On the other hand, a nematic liquid crystal composition was used as the liquid crystal 143.

According to the six modification, the gap over the entire region of the liquid crystal display device having a diagonal length of 4 inches was found to be as accurate as ±0.1 μm. Also, it was possible to suppress the light leakage (black dot in the case of operation under the normally white mode) around the columnar spacer, leading to an excellent picture image display on the screen.

As described above, the upper end surface in contact with the substrate of the columnar spacer 112$f$ is recessed in the central portion in the sixth modification. What should be noted is that the liquid crystal positioned within the recessed portion noted above permits scattering the light, leading to an excellent picture image display on the screen.

FIGS. 20 and 21 collectively show a seventh modification of the spacing means used in the present invention.

In the seventh modification, an alignment film 142 was formed on a first substrate 111 having a TFT and pixel electrodes formed thereon in advance in a matrix arrangement, followed by spin-coating the first substrate with a photosensitive a mixture solution of cardo epoxy acrylate (ASF-400 SHINNITTETSU KAGAKU Inc.), IRGA CURE-907, ethyl cellosolve acetate, and dipentaerithritol hexaacrylate (10:1:50:5) precursor at a speed of 3000 rpm and subsequently prebaking the coated film at 75° C. for 25 minutes by using a hot plate so as to form a photo-setting Cardo epoxy acrylate film. The photo-setting Cardo epoxy acrylate film thus formed was selectively exposed to light to form a latent pattern of columnar spacers, followed by applying a developing treatment to the film. A parallel light having a maximum wavelength of 365 nm and an energy density of 100 mw/cm$^2$ was used for the light exposure. On the other hand, a spraying method was employed for the developing treatment. Further, a spin-drying was applied for 20 seconds by using a nitrogen gas.

The resultant system was put in an oven, and the oven temperature was rapidly elevated from room temperature to 400° C. over a period of 30 minutes, followed by keeping the oven temperature at 400° C. for 30 minutes. As a result, the columnar spacer 112$g$ was shrunk inward, as shown in FIG. 20. It should be noted that the columnar spacer 112$g$ was shrunk in each of the upper end surface and the side surface. The resultant columnar spacer 112$g$ was found to be 5.2 μm in height, 15 μm in diameter at the lower end, and 12 μm in diameter at the narrowest portion in the center in the vertical direction. Further, the recessed portion in the upper end surface was found to be 12 μm in diameter and 1 μm in depth.

A liquid crystal display device having a diagonal length of 4 inches was prepared as shown in FIG. 21 by using the substrate 111 prepared as described above. The device was prepared as in the first modification. The gap between the substrates was found to be as accurate as ±0.2 μm over the entire region. Also, it was possible to suppress the light leakage around the columnar spacers. Further, the liquid crystal positioned within the recessed portion in the upper surface of the columnar spacer was effective for scattering the light, making it possible to further suppress the light leakage around the columnar spacers, with the result that the area of the black dot on the screen, which is caused by the light leakage during operation under the normally white mode, was markedly diminished. Naturally, an excellent picture image was displayed on the screen.

As described above, the upper end surface in contact with the substrate of the columnar spacer 112$g$ is recessed in the seventh modification described above. As a result, the liquid crystal positioned within the recessed portion noted above permits scattering the light so as to markedly lower the degree of light leakage of the liquid crystal display device.

The examples described above, which are intended to facilitate the description of the technical idea of the present invention, do not restrict the technical scope of the present invention. It should be noted that the technical idea of the present invention can also be applied to an active matrix type liquid crystal display device, a simple matrix type liquid crystal display device, and a colored liquid crystal projection type display device. Further, in the examples described above, an alignment film prepared by applying a rubbing treatment was used as an orienting means of the liquid crystal material. However, other techniques can also used in the present invention for orienting the liquid crystal. For example, grooves of micron order can be formed on the substrate surface for orienting the liquid crystal. It is also possible to use a laser beam for the orienting purpose.

Of course, various other modifications can be achieved within the technical scope of the present invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a liquid crystal display device comprising the steps of:

forming a film consisting essentially of polyimide on a first substrate having an electrode in a pixel region;

applying an alignment treatment to said polyimide film;

coating the alignment polyimide film with substantially one photosensitive resin selected from the group consisting of acrylic polymers and acrylic copolymers to form a photosensitive resin film, said photosensitive resin having at least one side chain selected from the group consisting of an epoxy group, an imide bond, an ether bond, an ester bond and an urethane bond;

exposing said photosensitive resin film to light;

developing with a developing agent having a solubility parameter not more than 9.8 $cal^{1/2}.cm^{-3/2}$ or not less than 12.7 $cal^{1/2}.cm^{-3/2}$ to form columnar spacing means made of said photosensitive resin; and forming a liquid crystal display element by using said first substrate having the spacing means formed thereon, a second substrate having an electrode and an alignment film formed thereon, said alignment film consisting essentially of polyimide, and a liquid crystal material.

2. The method of manufacturing a liquid crystal display device according to claim 1, wherein said step of forming a liquid crystal display element comprises the processes of:

preparing a second substrate having a transparent electrode and an alignment film formed thereon in advance, said alignment film consisting essentially of polyimide, followed by disposing said second substrate to face said first substrate with adhesive means interposed therebetween; and loading a liquid crystal material in a space defined by said first and second substrates and said spacing means to form a liquid crystal layer and, thus, to obtain a liquid crystal display element.

3. The method of manufacturing a liquid crystal display device according to claim 1, wherein said step of forming a liquid crystal display element comprises the processes of:

applying a liquid crystal material onto said first substrate having said spacing means formed thereon;

preparing a second substrate having a transparent electrode and an alignment film formed thereon in advance, said alignment film consisting essentially of polyimide; and disposing said second substrate to face the first substrate with said adhesive means and said liquid crystal material interposed therebetween.

4. The method of manufacturing a liquid crystal display device according to claim 1, wherein said acrylic polymer is a polymer of at least one monomer selected from the group consisting of monomethoxy 1,6-hexanediol monoacrylate, monomethoxy tripropyleneglycol monoacrylate, monomethoxy neobenzylglycol alkoxy monoacrylate, monomethoxy trimethylolpropane alkoxy diacrylate; and cardoepoxyacrylate.

5. The method of manufacturing a liquid crystal display device according to claim 1, wherein said acrylic copolymer is at least one copolymer selected from the group consisting of urethane-acrylic copolymer, ester-acrylic copolymer, polyimide-acrylic copolymer, epoxy-acrylic copolymer, and ether-acrylic copolymer.

6. The method of manufacturing a liquid crystal display device according to claim 1, wherein:

said photosensitive resin is coated over the entire surface of the first substrate including a pixel region, in which said alignment film is formed, and a non-pixel region in the step of forming said photosensitive resin film;

said photosensitive resin film is exposed to light in the light exposing step to form a latent spacing means within said pixel region and a latent masking layer pattern within said non-pixel region;

after the step of preparing said liquid crystal element, said non-pixel region is subjected to a plating treatment so as to form connecting means in that region of the first substrate which is not covered with said masking layer; and control means serving to control the liquid crystal layer to turn light on or off is formed to prepare a liquid crystal display device.

7. The method of manufacturing a liquid crystal display device according to claim 6, wherein said connecting means is selected from the group consisting of aluminium, gold, copper, and molybdenum.

8. The method of manufacturing a liquid crystal display device according to claim 1, wherein said step of forming said columnar spacing means is followed by additional steps of covering the upper end surface of said columnar spacing means with a resist film and, then, subjecting the side surface of said columnar spacing means to an etching treatment so as to make the columnar spacing means thinner in the central portion in the vertical direction than the end portions.

9. The method of manufacturing a liquid crystal display device according to claim 1, wherein said step of forming said columnar spacing means is followed by additional steps of covering the upper end surface of said columnar spacing means with a resist film, which is open in its central portion and, then, applying an etching treatment to the upper end surface of the columnar spacing means through the central open portion of said film so as to form a recessed portion in the central portion of the upper end surface of the columnar spacing means.

10. The method of manufacturing a liquid crystal display device according to claim 1, wherein said step of forming said columnar spacing means is followed by additional step of rapidly heating the columnar spacing means formed on the first substrate from 200° to 400° C., said elevated temperature being maintained so as to permit the columnar spacing means to be shrunk inward.

11. The method of manufacturing a liquid crystal display device according to claim 1, wherein:

said step of forming columnar spacing means is followed by an additional step of forming a resin layer on the center portion of the columnar spacing means and subjecting the columnar spacing means to develop by using a developing agent, said columnar spacing means having a truncated cone shape in which the diameter is diminished toward the top surface; and said step of preparing said liquid crystal display element comprises the process of preparing a second substrate having spacing means as in preparation of said first substrate, the process of disposing the second substrate to face the first substrate to permit the spacing means of the first and second substrates to be aligned so as to form columnar spacing means in which the central portion in the vertical direction is thinner than the end portions; and the process of loading a liquid crystal material in the space defined by the first and second substrates and said columnar spacing means.

12. The method of manufacturing a liquid crystal display device according to claim 1, wherein:

said step of exposing said photosensitive resin film to light is followed by an additional step of forming a resist film on both the alignment film and the columnar spacing means, except for the edge of the top surface of the columnar spacing means, developing by using a developing agent to etch the edge of the top surface, said columnar spacing means having substantially a truncated cone shape in which the diameter of said columnar spacing means is diminished stepwise toward the center; and said step of preparing said liquid crystal display element comprises the process of preparing a second substrate having spacing means as in preparation of said first substrate, the process of disposing the second substrate to face the first substrate to permit the spacing means of the first and second substrates to be aligned so as to form columnar spacing means in which the central portion in the vertical direction is thinner than the end portions; and the process of loading a liquid crystal material in the space defined by the first and second substrates and said columnar spacing means.

13. A liquid crystal display device, comprising: first and second substrates facing each other;

means for spacing said first and second substrates, said spacing means being columnar and made of a photosensitive resin selected from the group consisting of acrylic polymers and acrylic copolymers, and said photosensitive resin having at least one side chain selected from the group consisting of an epoxy group, an imide bond, an ether bond, and ester bond and a urethane bond;

a light transmission control layer positioned in a space between said first and second substrates held apart from each other by said spacing means; and control means for controlling said light transmission control layer so as to turn light on or off, wherein said acrylic polymer is a polymer of at least one monomer selected from the group consisting of monomethoxy 1,6-hexanediol monoacrylate, monomethoxy tripropyleneglycol monoacrylate, monomethoxy neobenzylglycol alkoxyl monoacrylate, monomethoxy trimethylolpropane alkoxy diacrylate, and cardoepoxyacrylate.

14. The liquid crystal display device according to claim 13, wherein said columnar spacing means is thinner in the central portion in the vertical direction than the end portions.

15. The liquid crystal display device according to claim 13, wherein said columnar spacing means is thinner stepwise toward the central portion in the vertical direction.

16. The liquid crystal display device according to claim 13, wherein at least one of the upper and lower end surfaces of said columnar spacing means is recessed in the central portion.

17. The liquid crystal display device according to claim 13, wherein said columnar spacing means is thinner in the central portion in the vertical direction than the end portions, and at least one of the upper and lower end surfaces of said columnar spacing means is recessed in the central portion.

18. The liquid crystal display device according to claim 13, wherein said first substrate has an alignment film consisting essentially of polyamide formed on that surface which faces said second substrate.

19. The liquid crystal display device according to claim 18, wherein said second substrate has an alignment film consisting essentially of polyimide formed on that surface which faces said first substrate.

20. A liquid crystal display device, comprising:

first and second substrates facing each other, said first substrate having an electrode in a pixel region and an alignment film consisting essentially of polyimide formed on said first substrate in order;

means for spacing said first and second substrate, said spacing means being columnar and produced by the steps of:

coating a photosensitive resin selected from the group consisting of acrylic polymers and acrylic copolymers to form a photosensitive resin film, said photosensitive resin having at least one side chain selected from the group consisting of an epoxy group, an imide bond, an ether bond, an ester bond and an urethane bond;

exposing said photosensitive resin film to light;

developing with a developing agent having a solubility parameter not more than 9.8 cal$^{1/2}$.cm$^{-3/2}$ or not less than 12.7 cal$^{1/2}$.cm$^{-3/2}$;

a light transmission control layer positioned in a space between said first and second substrates held apart from each other by said spacing means; and control means for controlling said light transmission control layer so as to turn light on or off.

* * * * *